United States Patent
Hodohara et al.

(10) Patent No.: US 10,641,617 B2
(45) Date of Patent: May 5, 2020

(54) CALIBRATION DEVICE AND CALIBRATION METHOD

(71) Applicant: Mitsubishi Electric Corporation, Tokyo (JP)

(72) Inventors: Norifumi Hodohara, Tokyo (JP); Takahisa Aoyagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 539 days.

(21) Appl. No.: 15/449,215

(22) Filed: Mar. 3, 2017

(65) Prior Publication Data

US 2018/0058882 A1    Mar. 1, 2018

(30) Foreign Application Priority Data

Sep. 1, 2016   (JP) .................................. 2016-170805

(51) Int. Cl.
| | |
|---|---|
| G01C 25/00 | (2006.01) |
| G06T 7/73 | (2017.01) |
| G06T 7/80 | (2017.01) |
| B60R 1/00 | (2006.01) |
| B60R 11/04 | (2006.01) |
| G01C 21/26 | (2006.01) |

(52) U.S. Cl.
CPC .............. *G01C 25/005* (2013.01); *B60R 1/00* (2013.01); *B60R 11/04* (2013.01); *G01C 21/26* (2013.01); *G06T 7/73* (2017.01); *G06T 7/80* (2017.01); *B60R 2300/30* (2013.01); *G06T 2207/10024* (2013.01); *G06T 2207/30208* (2013.01); *G06T 2207/30244* (2013.01); *G06T 2207/30252* (2013.01)

(58) Field of Classification Search
CPC .................................................. G01C 25/005
See application file for complete search history.

(56) References Cited

U.S. PATENT DOCUMENTS

| 2017/0017847 A1* | 1/2017 | Nakaya ...................... B60R 1/00 |
| 2017/0309042 A1* | 10/2017 | Tanaka ...................... B60R 1/00 |

FOREIGN PATENT DOCUMENTS

JP    2013-089984 A    5/2013

* cited by examiner

*Primary Examiner* — Manuel A Rivera Vargas
(74) *Attorney, Agent, or Firm* — Sughrue Mion, PLLC; Richard C. Turner

(57) ABSTRACT

A calibration device includes: a coordinate calculator that calculates coordinates of a plurality of rigid body-based points on a vehicle-based coordinate system from measurement values of respective distances between two points constituted by a combination of one of a plurality of vehicle-based points and one of the plurality of rigid body-based points, the plurality of vehicle-based points having known coordinates on the vehicle-based coordinate system and the plurality of rigid body-based points having known coordinates on a rigid body-based coordinate system; and a parameter calculator that calculates a relative attitude and a relative position of an origin as calibration parameters from a correspondence relationship between positions of image coordinates of the plurality of rigid body-based points within a captured image and the coordinates of the plurality of rigid body-based points on the vehicle-based coordinate system.

18 Claims, 11 Drawing Sheets

CALIBRATION DEVICE AND CALIBRATION METHOD

BACKGROUND OF THE INVENTION

1. Field of the Invention

This invention relates to a calibration device and a calibration method used to calibrate a camera mounted on a vehicle.

2. Description of the Related Art

Recent years have witnessed an increase in the use of cameras and sensors attached to vehicles for the purpose of capturing images of the vehicle periphery. When a peripheral obstruction or the like is detected by a camera or a sensor, a controller that controls the vehicle can apply an emergency brake to the vehicle while the vehicle is in motion.

The controller is also capable of synthesizing a plurality of images of the vehicle periphery, obtained via the cameras and sensors, and providing a user with the resulting synthesized image. At this time, positional and attitude relationships between the camera or sensor and the vehicle must be measured accurately to ensure that the peripheral obstruction is detected accurately or that a smooth synthesized image of the vehicle periphery is obtained.

A method of performing the measurements described above is known as a calibration method. This calibration method is essential when attaching cameras and sensors to a vehicle.

When the position and attitude of a camera or a sensor for use in a vehicle are actually calibrated, first, the controller obtains a marker disposed on the ground or a wall using the sensor. The controller then determines a position and an attitude in which the sensor is to be disposed relative to the vehicle from relative positions of the sensor and the marker and relative positions of the marker and the vehicle (see Japanese Patent Application Publication No. 2013-89984, for example).

SUMMARY OF THE INVENTION

However, the prior art includes the following problems.

In a typical method of calibrating a camera or a sensor, the marker must be disposed accurately in a known position and a known attitude relative to the vehicle so that the positional relationship between the camera or sensor and the vehicle can be measured precisely.

In other words, in a conventional calibration method, a marker serving as a target must be disposed accurately in a location having a known position and a known attitude relative to a host vehicle. For this purpose, it is necessary to draw accurate coordinate axes centering on the vehicle, or an intersecting pattern conforming thereto, on the ground using leveling string or the like.

A conventional calibration method employed in a case where "a target marker is disposed in a location 2 m in front of a host vehicle, 1 m to the left of the host vehicle, and at an identical incline to the host vehicle on a vehicle coordinate system in which a point on the ground in the center of a front end of the host vehicle is set as the origin and a vehicle advancement direction is set as one of the axes" will be described briefly as an example. With this conventional calibration method, it is necessary to execute following procedures 1 to 4.

(Procedure 1) First, a point on the ground in the center of the front end of the vehicle and a point on the ground in the center of a rear end of the vehicle are marked using plumb bobs.

(Procedure 2) Next, a straight line passing through these two points and passing underneath the vehicle is drawn using leveling string, and this straight line is set as the vehicle advancement direction axis.

(Procedure 3) Next, a point 2 m in front of the center of the front end of the vehicle is measured using a tape measure, and a straight line that is orthogonal to the vehicle advancement direction axis is drawn from this point using leveling string.

(Procedure 4) Finally, the target marker is disposed on the orthogonal straight line at a point located 1 m to the left of the vehicle advancement direction axis.

Here, a method employing a marking device, a plotting method employing a compass, or the like must be applied to draw the orthogonal straight line pattern in procedure 3. However, the former method requires an expensive specialist device, while the latter requires a complicated operation that may be performed erroneously by an operator such that the straight line pattern is plotted inaccurately.

In the example described above, calibration is performed during readjustment in a dealership or the like where the marker is not disposed in advance. However, even when the calibration is performed in a factory or the like where the marker is disposed in advance, it is difficult to determine the relative positions and attitudes of the host vehicle and the marker to a degree of precision of approximately 1 cm or less, for example.

A case in which an operator drives the vehicle to a calibration operation space within a factory will now be considered. In this case, it is extremely difficult even for a highly experienced operator to park the vehicle in a set position without deviating from the set position by an angle of even 10. Moreover, even when devices such as wheel stoppers are provided to stop the vehicle in the set position, it is often impossible to guarantee a degree of precision at which the vehicle can be parked without deviating by even 1°.

This invention has been designed to solve the problems described above, and an object thereof is to provide a calibration device and a calibration method with which there is no need to use a specialist device to dispose a marker, and the position of the marker can be calculated in a smaller number of steps than with a conventional method.

A calibration device according to this invention measures relative positions and relative attitudes of a rigid body disposed on the ground and a vehicle, and includes: a measured distance input device that receives, based on an input operation performed by an operator, measurement values of respective distances between two points on the basis of a plurality of vehicle-based points having known coordinates on a vehicle-based coordinate system that is defined in accordance with a stopping position of the vehicle and includes an origin and two axes located on the ground, and a plurality of rigid body-based points having known coordinates on a rigid body-based coordinate system that is defined by a disposal location of a marker serving as the rigid body disposed on the ground and includes an origin and two axes located on the ground, the two points being constituted by a combination of one of the plurality of vehicle-based points and one of the plurality of rigid body-based points; and a calibration parameter calculation device that calculates a relative attitude of the rigid body-based coordinate system and a relative position of the origin thereof on the vehicle-based coordinate system as calibration parameters on the basis of the respective measurement values and a captured image including the marker, which is captured by a camera that is mounted on the vehicle and subjected to calibration, the calibration parameter calculation device having: a coordinate calculator that calculates coordinates of the plurality of rigid body-based points on the vehicle-based coordinate system from the respective measurement values; and a parameter calculator that calculates the relative attitude and the relative position of the origin as the calibration parameters from a correspondence relationship between positions of image coordinates of the plurality of rigid body-based points included in the captured image and the coordinates of the plurality of rigid body-based points on the vehicle-based coordinate system.

Further, a calibration method according to this invention is used to measure relative positions and relative attitudes of a rigid body disposed on the ground and a vehicle, and includes: a first step in which respective coordinates of a plurality of rigid body-based points having known coordinates on a rigid body-based coordinate system are stored in advance in a storage unit, the rigid body-based coordinate system being defined by a disposal position of a marker serving as the rigid body disposed on the ground and including an origin and two axes located on the ground; a second step in which measurement values of respective distances between two points are received, via a measured distance input device based on an input operation performed by an operator, on the basis of the plurality of rigid body-based points and a plurality of vehicle-based points having known coordinates on a vehicle-based coordinate system that is defined in accordance with a stopping position of the vehicle and includes an origin and two axes located on the ground, the two points being constituted by a combination of one of the plurality of vehicle-based points and one of the plurality of rigid body-based points; a third step in which a captured image including the marker, which is captured by a camera that is mounted on the vehicle and subjected to calibration, is obtained; a fourth step in which coordinates of the plurality of rigid body-based points on the vehicle-based coordinate system are calculated from the respective measurement values; and a fifth step in which a relative attitude of the rigid body-based coordinate system and a relative position of the origin thereof on the vehicle-based coordinate system are calculated as calibration parameters from a correspondence relationship between positions of image coordinates of the plurality of rigid body-based points included in the captured image and the coordinates of the plurality of rigid body-based points on the vehicle-based coordinate system, the coordinates having been stored in the storage unit.

This invention is configured such that the coordinates of the plurality of rigid body-based points on the vehicle-based coordinate system are calculated on the basis of measurement values of respective distances between two points constituted by a combination of one of the plurality of vehicle-based points on the vehicle-based coordinate system and one of the plurality of rigid body-based points on the rigid body-based coordinate system, and the relative attitude of the camera and the relative position of the origin thereof are calculated as the calibration parameters from the correspondence relationship between the positions of the image coordinates of the plurality of rigid body-based points included in the captured image, the captured image having been captured by the camera mounted on the vehicle, and the coordinates of the plurality of rigid body-based points on the vehicle-based coordinate system. As a result, it is possible to obtain a calibration device and a calibration method with which there is no need to use a specialist device to dispose a marker, and the position of the marker can be calculated in a smaller number of steps than with a conventional method.

DESCRIPTION OF THE PREFERRED EMBODIMENTS

Preferred embodiments of a calibration device and a calibration method according to this invention will be described below using the drawings.

First Embodiment

Figure 1:
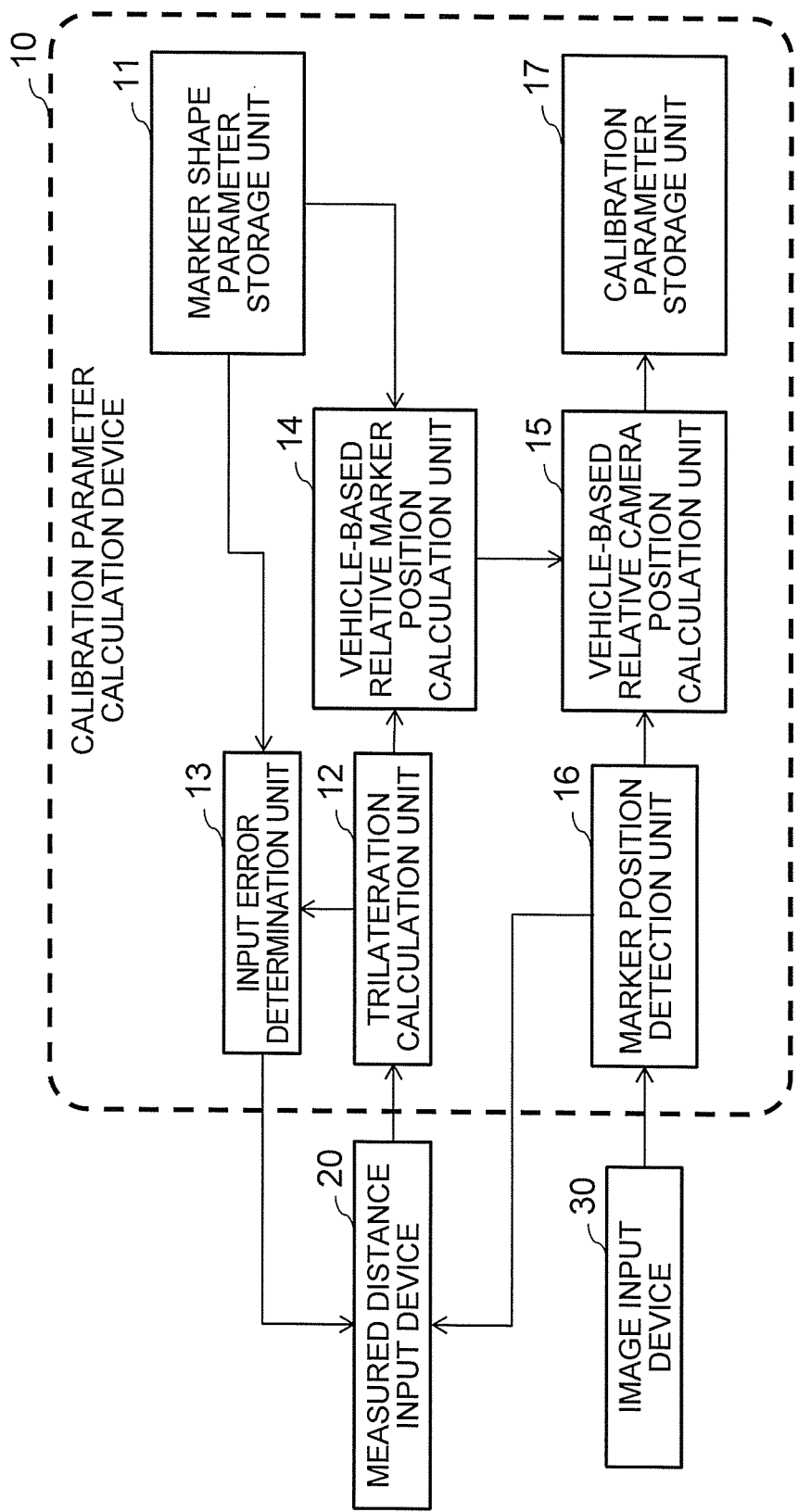
FIG. 1 is a block diagram showing a calibration device that executes a calibration method according to a first embodiment of this invention.
Figure 2:
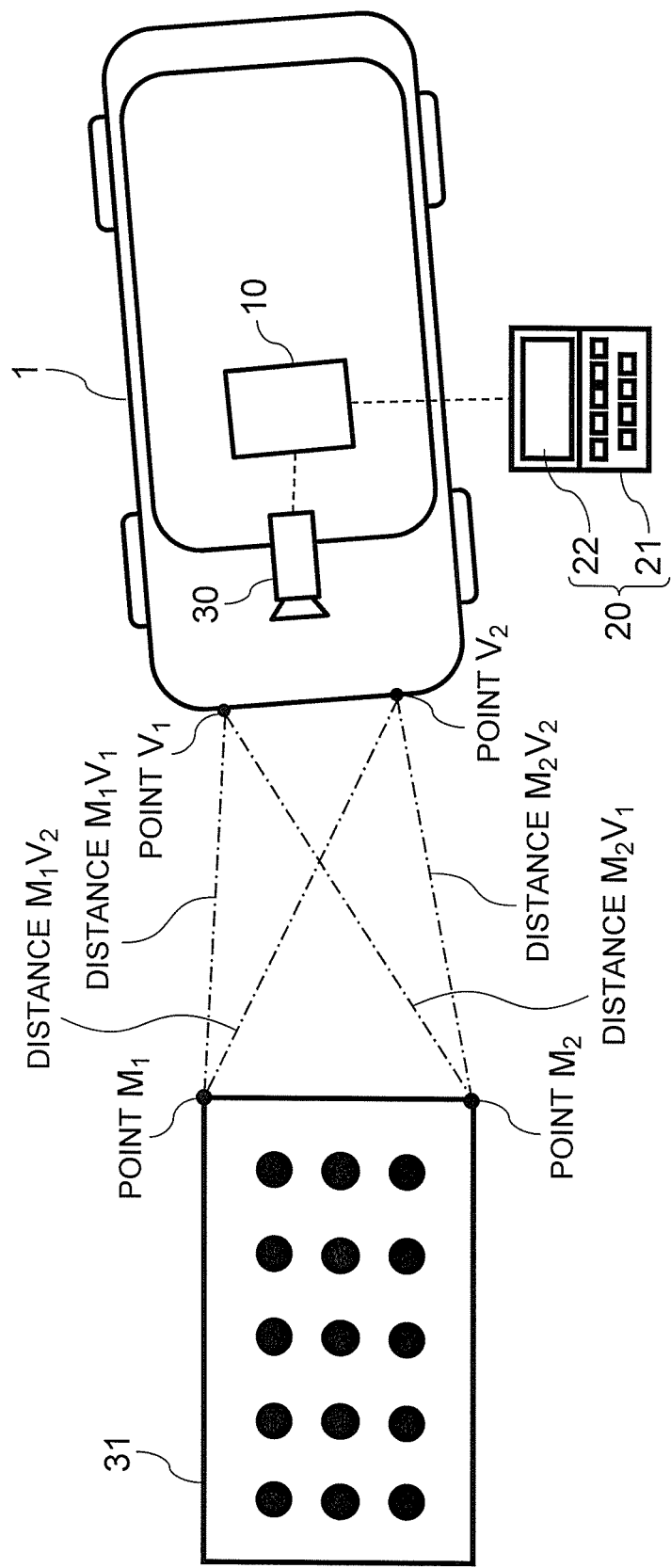
FIG. 2 is a schematic external view illustrating calibration parameter calculation executed by the calibration device according to the first embodiment of this invention.

FIG. 1 is a block diagram showing a calibration device that executes a calibration method according to a first embodiment of this invention. Further, FIG. 2 is a schematic external view illustrating calibration parameter calculation executed by the calibration device according to the first embodiment of this invention. In FIGS. 1 and 2, a measured distance input device 20 and an image input device 30 are shown together with a calibration parameter calculation device 10.

The measured distance input device 20 is configured to include a keyboard 21 on which an operator inputs numerical values of measured distances, and a screen 22 for displaying the input numerical values.

The image input device 30, although not shown in detail in the drawings, is configured to include a lens, an imaging device, and a distortion correction unit, and is mounted on a vehicle 1. Hereafter, the image input device 30 will be referred to simply as a "camera 30". The camera 30 captures an image of a target marker 31 disposed on the ground and used during calibration.

Hereafter, the target marker 31 will be referred to simply as a "marker 31", and an image captured by the camera 30 as an image including the marker 31 will be referred to as a "marker image".

The calibration parameter calculation device 10 shown in FIG. 1 calculates a relative position and a relative attitude of the camera 30 relative to the marker 31 as calibration parameters on the basis of distance data input by the operator via the measured distance input device 20, and the marker image captured by the camera 30. Accordingly, an internal configuration of the calibration parameter calculation device 10 that performs calculation processing for calculating the calibration parameters will now be described in detail.

The calibration parameter calculation device 10 according to the first embodiment, shown in FIG. 1, is configured to include a marker shape parameter storage unit 11, a trilateration calculation unit 12, an input error determination unit 13, a vehicle-based relative marker position calculation unit 14, a vehicle-based relative camera position calculation unit 15, a marker position detection unit 16, and a calibration parameter storage unit 17.

Here, the vehicle-based relative camera position calculation unit 15 of the calibration parameter calculation device 10 corresponds to a parameter calculation unit (parameter calculator). Further, the marker shape parameter storage unit 11, the trilateration calculation unit 12, the vehicle-based relative marker position calculation unit 14, the vehicle-based relative camera position calculation unit 15, the marker position detection unit 16, and the calibration parameter storage unit 17 of the calibration parameter calculation device 10 correspond to a coordinate calculation unit (coordinate calculator).

Information relating to the shape of the marker 31 is stored in the marker shape parameter storage unit 11 in advance. Feature point information indicating colors, shapes, an arrangement, and so on of feature points included in the marker 31, information indicating an outer shape of the marker 31, and so on may be cited as specific examples of this information.

In FIG. 2, fifteen feature points depicted as black circles are disposed within the marker 31, which has a rectangular outer shape, while an upper right portion of the outer shape is set as a point $M_1$ and a lower right portion is set as a point $M_2$. Furthermore, in FIG. 2, points dropped vertically onto the ground from two specific points on the vehicle 1 are set respectively as a point $V_1$ and a point $V_2$.

From the arrangement of these four points, namely the point $M_1$, the point $M_2$, the point $V_1$, and the point $V_2$, the operator actually measures four distances, namely a distance $M_1V_1$, a distance $M_1V_2$, a distance $M_2V_1$, and a distance $M_2V_2$. The operator then inputs the four actually measured distances via the measured distance input device 20.

The trilateration calculation unit 12 calculates coordinates of the points $M_1$, $M_2$ based on the point $V_2$ from the numerical values of the four distances input therein from the measured distance input device 20 using a trilateration formula, and outputs the calculated coordinates to the input error determination unit and the vehicle-based relative marker position calculation unit.

The input error determination unit 13 determines whether or not the measured distances input by the operator are valid by comparing the coordinates of the points $M_1$, $M_2$ calculated by the trilateration calculation unit 12 using the point $V_2$ as a basis with the information indicating the outer shape of the marker 31, which is stored in advance in the marker shape parameter storage unit 11, and transmits a determination result to the measured distance input device 20.

The trilateration executed by the trilateration calculation unit 12 and the determination processing executed by the input error determination unit 13 will be described in detail below using drawings and formulae.

Note that when the operator learns from the determination result displayed by the measured distance input device 20 that the input error determination unit 13 has determined that the measured distances are invalid, the operator must input the distance $M_1V_1$, the distance $M_1V_2$, the distance $M_2V_1$, and the distance $M_2V_2$ again.

The vehicle-based relative marker position calculation unit 14 calculates coordinates of the group of feature points included in the marker 31 on a vehicle coordinate system from the coordinates of the points $M_1$, $M_2$ calculated by the trilateration calculation unit 12 using the point $V_2$ as a basis and the outer shape information and feature point information relating to the marker 31, which is stored in advance in the marker shape parameter storage unit 11, and transmits the calculated coordinates to the vehicle-based relative camera position calculation unit 15.

Figure 3:
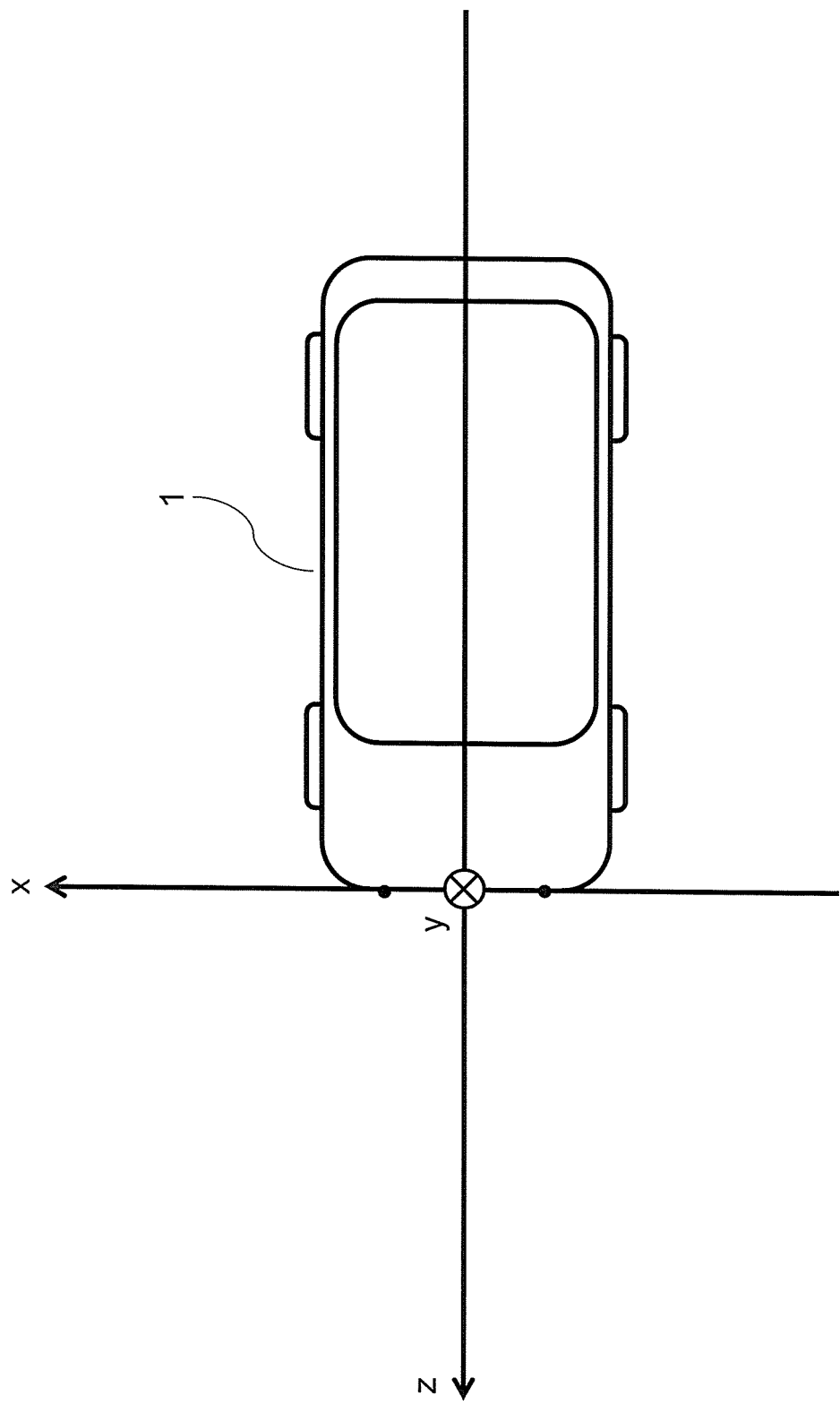
FIG. 3 is an illustrative view showing a vehicle coordinate system according to the first embodiment of this invention.

Here, FIG. 3 is an illustrative view showing the vehicle coordinate system according to the first embodiment of this invention. A coordinate system in which a point obtained by dropping a central front end point of the vehicle 1 vertically onto the ground is set as the origin 0, an advancement direction is defined as the z axis, a rightward direction is defined as the x axis, and an earthward direction is defined as the y axis corresponds to the vehicle coordinate system according to this invention.

The marker position detection unit 16 detects the positions of the group of feature points included in the marker 31 from the marker image received from the image input device 30, and transmits coordinates thereof on the image to the vehicle-based relative camera position calculation unit 15.

The vehicle-based relative camera position calculation unit 15 calculates a position and an attitude of the camera on the vehicle coordinate system from the coordinates of the positions of the feature points included in the marker on the image, these coordinates having been received from the marker position detection unit, and the coordinates of the positions of the feature points included in the marker on the vehicle coordinate system, these coordinates having been received from the vehicle-based relative marker position calculation unit 14.

The vehicle-based relative camera position calculation unit 15 then stores the position and the attitude of the camera on the vehicle coordinate system in the calibration parameter storage unit 17. As a result, the calibration parameter storage unit 17 can store calibration parameters relating to the position and attitude of the camera, calculated by the vehicle-based relative camera position calculation unit 15, in a ROM.

Next, operating procedures undertaken when implementing calibration according to the first embodiment will be described in sequence.

It is assumed that the calibration operation is performed on horizontal ground having no irregularities. Further, it is assumed that a calibration space is secured appropriately in accordance with the size and location of the marker 31 corresponding to the number of cameras to be calibrated and field angles thereof.

The target marker 31 includes a plurality of feature points in a known pattern. More specifically, the plurality of feature points are provided in order to calculate the position and attitude of the camera. The marker 31 must be disposed in a roughly fixed position so that the entire marker 31 can be photographed by the camera 30 to be calibrated, but the precise position thereof does not yet have to be known.

It is assumed here that the feature point information, which indicates the positions of the plurality of feature points included in the marker 31 and the number of feature points located in each position, and the information indicating the outer shape information of the marker 31 are known in advance. In the first embodiment, the feature points are respectively formed from black circles and disposed in a regular arrangement on the marker 31 so that the positions of group of feature points included in the marker 31 can be detected easily by automatic processing during subsequent image processing.

Further, the two outside corners of the marker 31 that are closest to the host vehicle 1 are set as the point $M_1$ and the point $M_2$. Furthermore, two points dropped vertically onto the ground from two specific points on the vehicle 1 are set as the point $V_1$ and the point $V_2$. Note that coordinate positions of the point $V_1$ and the point $V_2$ on the vehicle coordinate system are assumed to have been measured in advance, and are therefore known. In the first embodiment, points dropped vertically onto the ground from ends of left and right headlamps are set as $V_1$ and $V_2$.

Figure 4:
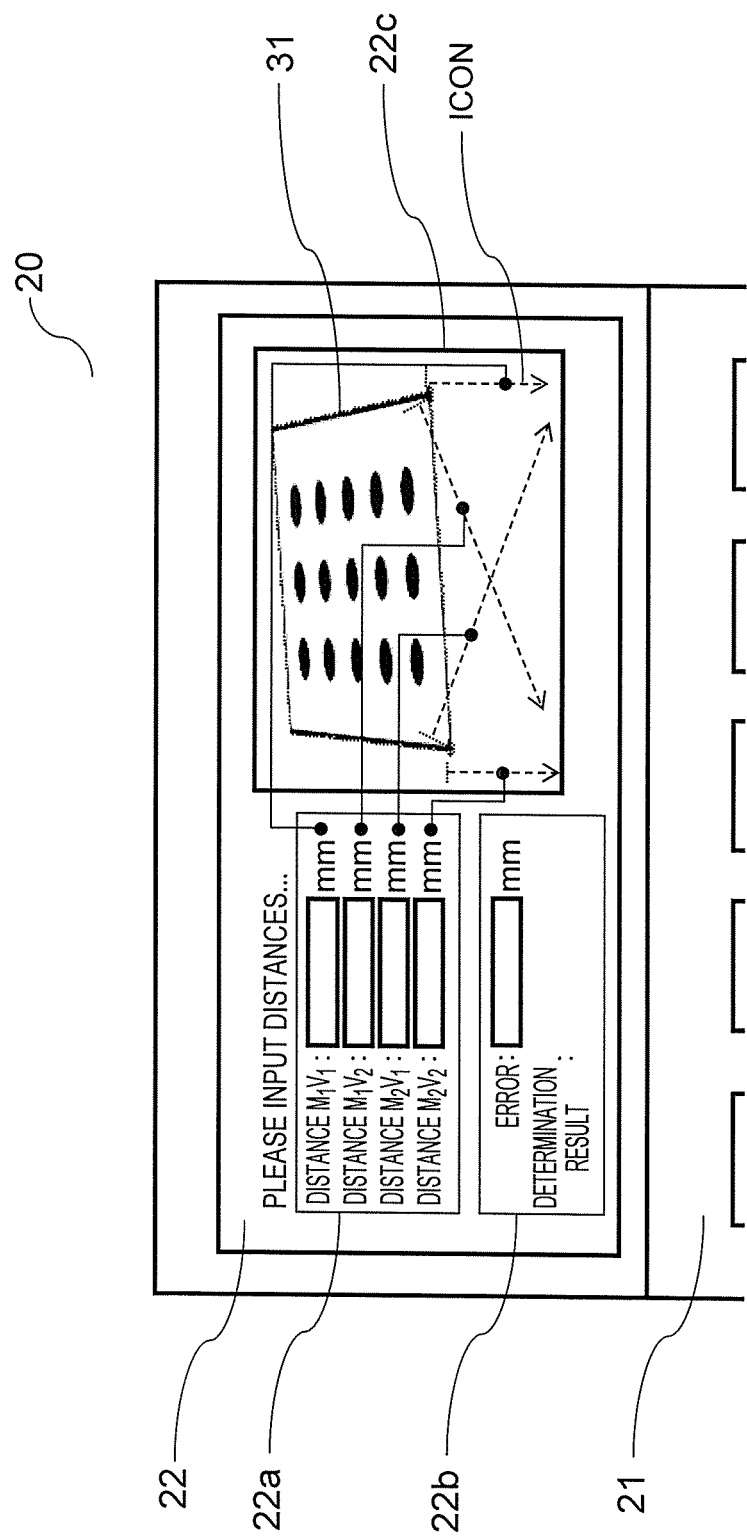
FIG. 4 is an illustrative view showing a screen configuration of a measured distance input device according to the first embodiment of this invention.

FIG. 4 is an illustrative view showing a screen configuration of the measured distance input device 20 according to the first embodiment of this invention. The screen 22 is constituted by an input unit 22a for inputting measured distances, an output unit 22b for displaying an error together with the determination result obtained by the input error determination unit 13 as to whether or not the numerical values of the input distances are valid, and a display unit 22c for displaying a camera image.

A camera image input from the camera 30 is output to the display unit 22c. Hence, the operator can check whether or not the disposed marker 31 is within the imaging range of the camera from the camera image displayed by the display unit 22c.

The measured distance input device 20 also has a function for displaying icons that are overlaid onto the display unit 22c in accordance with items input into the input unit 22a so as to represent positions on the image corresponding to the four distances from the points $M_1$ and $M_2$ serving as the marker positions detected by the marker position detection unit 16 to the points $V_1$ and $V_2$ serving as measurement subjects. By providing this function, the operator can easily confirm which distance corresponds to which input item by sight.

Further, when the icons are displayed by the display unit 22c so as to be overlaid onto the captured image, the position of the marker within the camera image can be detected using image processing, and the display positions of the icons can be corrected to accurate positions in accordance with the detection result. In other words, the display positions of the icons can be corrected to accurate positions regardless of the position in which the host vehicle 1 is stopped or the condition in which the camera 30 is mounted.

Furthermore, when an application for creating a synthesized image from the calibration parameters using a plurality of cameras is provided, the measured distance input device 20 may be configured to cause the display unit 22c to display a synthesized image reflecting the calibration calculation result so that the quality of the image can be checked.

Figure 5:
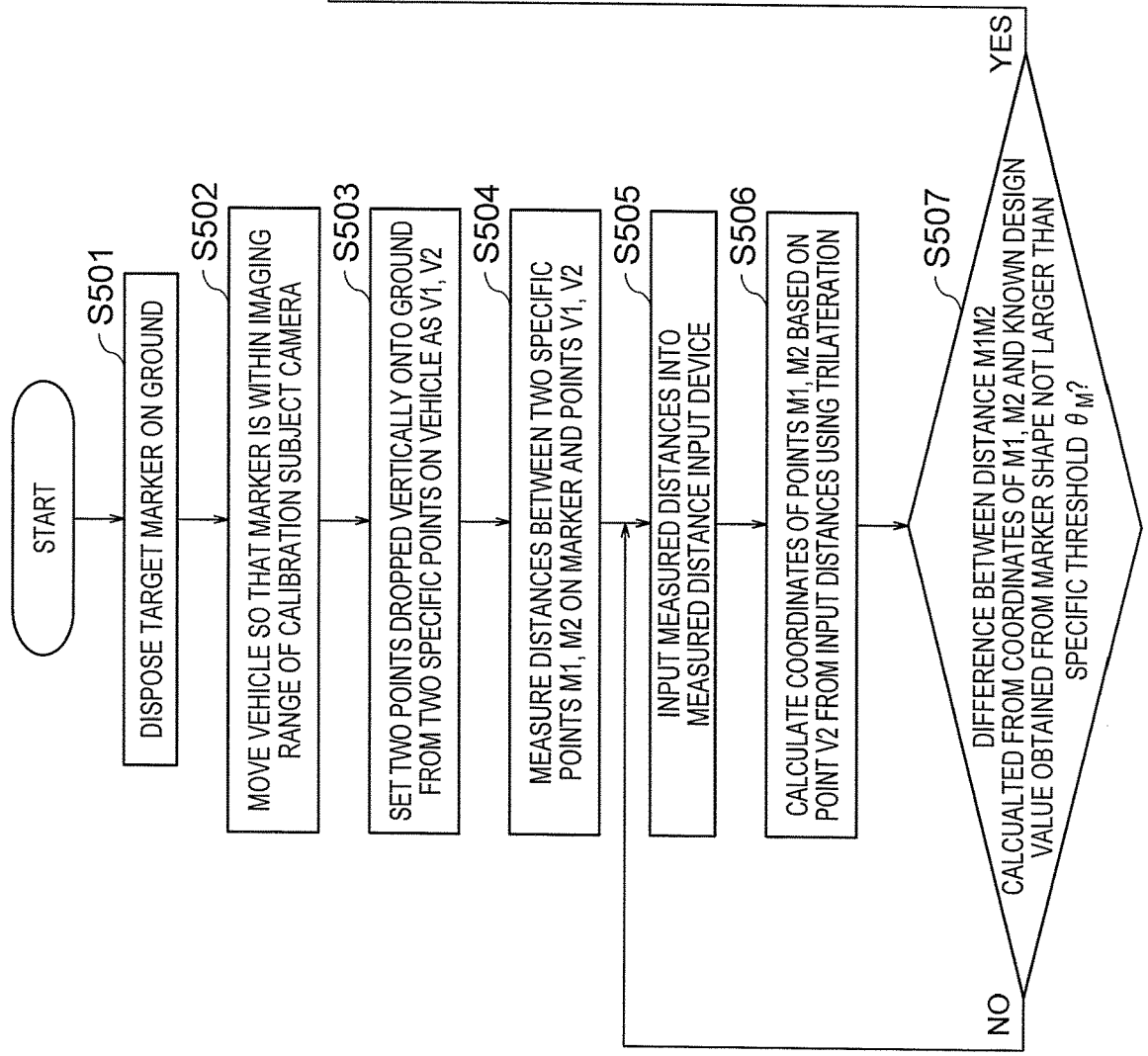
FIG. 5 is a flowchart showing a series of processing procedures of the calibration method according to the first embodiment of this invention.

Next, specific procedures executed in the calibration method according to the first embodiment will be described in consideration of the content described above using FIGS. 1 to 4. FIG. 5 is a flowchart showing a series of processing procedures of the calibration method according to the first embodiment of this invention.

First, in step S501, the operator disposes the marker 31 including the plurality of feature points on the ground within the imaging range of the camera 30.

At this time, the position of the marker 31 and the relative position of the host vehicle 1 do not yet have to be known accurately. However, the position in which to dispose the marker 31 is set roughly in advance in order to stabilize the precision of the calibration calculation that is executed using the image captured by the camera 30. In the first embodiment, the marker 31 is disposed on the ground in front of the host vehicle 1 in a position enabling image capture thereof within a wide field angle range of the camera 30.

Next, in step S502, the operator moves the vehicle 1 so that the marker 31 is within the actual imaging range of the camera 30 to be calibrated, which is mounted on the vehicle 1. At this time, the operator can determine the position in which to stop the vehicle 1 while referring to the captured image displayed by the display unit 22c of the measured distance input device 20.

Next, in step S503, the operator marks two points dropped vertically onto the ground from two specific points on the vehicle 1 using a marker pen or the like. At this time, the two points can be determined accurately by employing a tool such as a plumb bob. These two points serve as the point $V_1$ and the point $V_2$ shown in FIG. 2.

Note that the respective positions of the point $V_1$ and the point $V_2$ are preferably set such that no unwanted obstructions such as the tires of the host vehicle 1 exist between the points $V_1$ and $V_2$ and the marker points $M_1$ and $M_2$. In so doing, a subsequent operation to measure the distances between the points can be performed more easily.

Furthermore, in the first embodiment, to facilitate subsequent calculations, the respective positions of the point $V_1$ and the point $V_2$ are set such that a straight line $V_1V_2$ linking the two points is parallel to the x axis of the vehicle coordinate system.

Next, in step S504, the operator measures the distances between the points $M_1$ and $M_2$ on the marker and the points $V_1$ and $V_2$ on the vehicle body using a tape measure or the like. More specifically, as shown in FIG. 2, the measured distances are the four distances between $M_1$ and $V_1$, between $M_1$ and $V_2$, between $M_2$ and $V_1$, and between $M_2$ and $V_2$.

Next, in step S505, the operator inputs the numerical values of the four measured distances via the measured distance input device 20. More specifically, the operator inputs measurement results for the four distances by setting numerical values in accordance with the items of the input unit 22a shown in FIG. 4.

Figure 6:
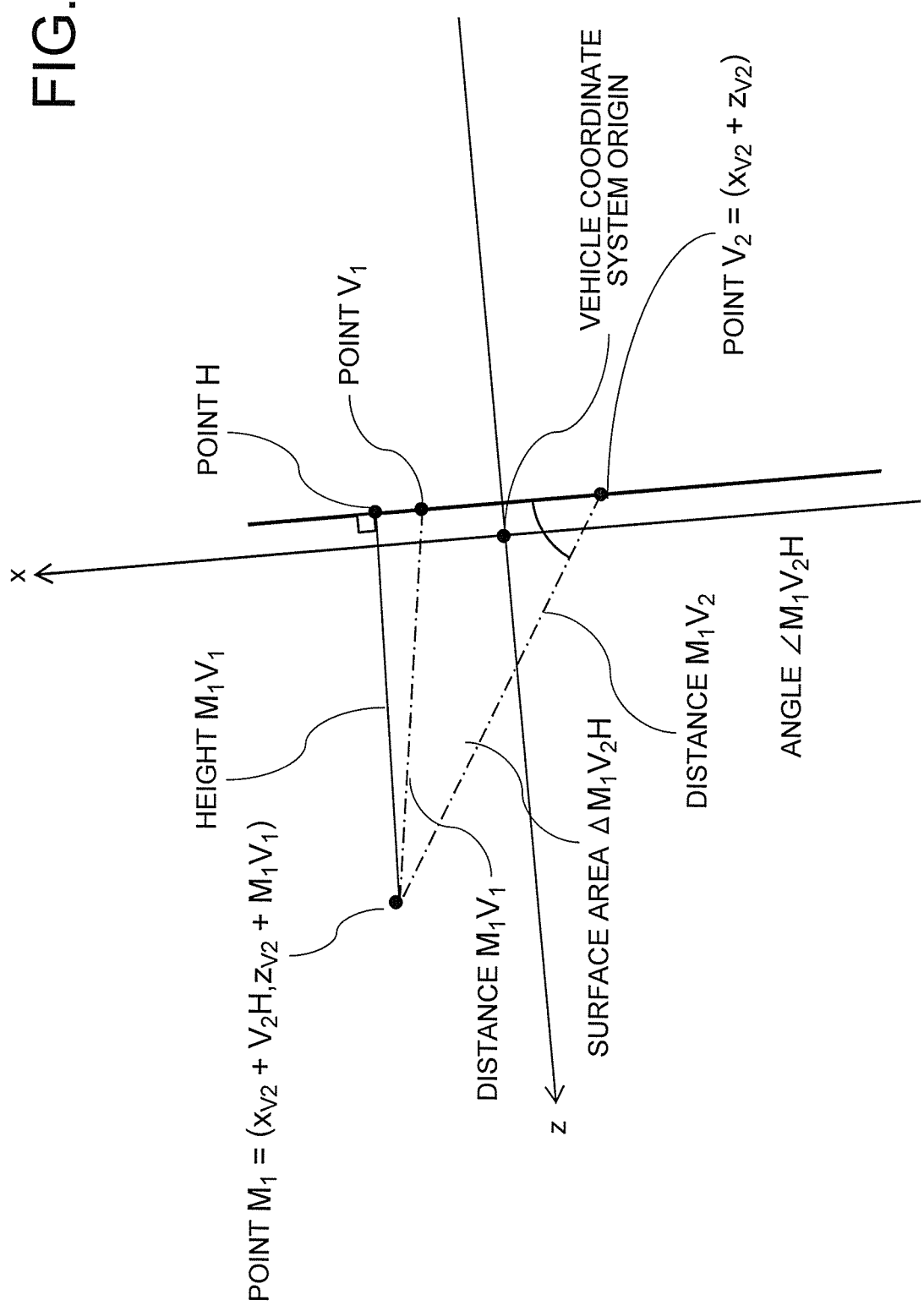
FIG. 6 is an illustrative view showing a trilateration method executed by a trilateration calculation unit according to the first embodiment of this invention.

Next, in step S506, the trilateration calculation unit 12 of the calibration parameter calculation device 10 calculates the coordinates of the point $M_1$ and the point $M_2$ based on the point $V_2$ from the numerical values of the four distances input via the measured distance input device 20. FIG. 6 is an illustrative view showing a trilateration method executed by the trilateration calculation unit 12 according to the first embodiment of this invention. Note that FIG. 6 shows an example of a case in which the coordinates of the point $M_1$ are calculated.

Specifically, the trilateration calculation unit 12 uses Equations (1) and (2) shown below, in which trilateration is employed, to determine a distance $V_2H$ and a distance $M_1H$ with respect to a point H dropped vertically onto the straight line $VV_2$ from the point $M_1$ on the vehicle coordinate system shown in FIG. 6.

[Math. 1]

$$\text{Distance } \overline{V_2 H} = \frac{\overline{M_1 V_2}^2 + \overline{V_1 V_2}^2 - \overline{M_1 V_1}^2}{2 \cdot \overline{V_1 V_2}} \quad (1)$$

$$\text{Distance } \overline{M_1 H} = \sqrt{\overline{M_1 V_2}^2 - \overline{V_2 H}^2} \quad (2)$$

The distance $V_2H$ and the distance $M_1H$ determined in this manner represent values of an x coordinate and a z coordinate of the point $M_1$ when the point $V_2$ is set as the origin and the straight line $V_2V_1$ is set as the x axis. The trilateration calculation unit 12 also calculates the coordinate values of the point $M_2$ using a similar method.

Next, in step S507, the input error determination unit 13 calculates a distance $M_1M_2$ using the coordinates of the point $M_1$ and the point $M_2$, determined by the trilateration calculation unit 12. Further, the input error determination unit 13 reads a design value of the distance $M_1M_2$, which forms a part of the outer shape of the marker 31, from the marker shape parameter storage unit 11. In the following description, the design value of the distance $M_1M_2$ will be distinguished from the distance $M_1M_2$ obtained as a calculated value by being referred to as a distance $M_1M_{2truth}$.

The input error determination unit 13 then determines whether or not the distance $M_1M_2$ is a valid value using the distance $M_1M_2$ obtained as a calculated value, the distance $M_1M_{2truth}$ serving as the design value, and a specific threshold $\theta_M$ by determining whether or not Equation (3), shown below, is true.

[Math. 2]

$$|\overline{M_1 M_2} - \overline{M_1 M_{2truth}}| < \theta_M \quad (3)$$

When the input error determination unit 13 determines that Equation (3) is true, this means that the measurement values input by the operator in step S505 are valid. Accordingly, the routine advances to processing executed by the vehicle-based relative camera position calculation unit in step S508.

When the input error determination unit 13 determines that Equation (3) is false, on the other hand, this means that the measurement values input by the operator in step S505 are invalid. Accordingly, the operator is notified of this fact and the value of the error via the output unit 22b of the measured distance input device 20, as shown in FIG. 4, whereupon the routine returns to the processing of step S505, where the operator is prompted to perform re-measurement and re-input processing.

Note that a difference between the distance $M_1M_2$ and the distance $M_1M_{2truth}$, when measured correctly using a tape measure, is assumed to be not greater than 1 cm. In the first embodiment, therefore, the value of the specific threshold $\theta_M$ used in Equation (3) is set at 2 cm, for example.

Next, when the routine advances to step S508, the vehicle-based relative marker position calculation unit 14 converts the coordinates of the point $M_1$ and the point $M_2$ based on the point $V_2$, determined by the trilateration calculation unit 12, into coordinates based on vehicle coordinates. In the first embodiment, as described above, the points $V_1$ and $V_2$ are set such that the straight line $V_1V_2$ is parallel to the x axis of the vehicle coordinates. Therefore, coordinate conversion may be achieved by the vehicle-based relative marker position calculation unit 14 simply by adding the coordinate value of the point $V_2$ based on the vehicle coordinates to the coordinates based on the point $V_2$.

The straight line $V_1V_2$ may of course be set so as not to be parallel or perpendicular to the vehicle coordinate system. In this case, however, rotation is added to the coordinate conversion, leading to an increase in the calculation processing load.

Furthermore, instead of setting the point $V_1$ and the point $V_2$ on the ground, the coordinates $M_1$, $M_2$ on the vehicle coordinate system may be determined by specifying desired three-dimensional points having a y axis component. In this case, however, three-dimensional coordinate conversion must be performed, and therefore calculation processing for calculating a three-dimensional rotation matrix is required.

Moreover, when desired three-dimensional points are specified, it becomes slightly more difficult to measure the distance $M_1V_1$ and so on. More specifically, it is necessary to measure the distances in the air rather than on the ground, and therefore the risk of measurement errors due to bending of the tape measure or the like increases.

Next, in step S509, the operator uses the camera 30 to capture an image including the marker 31 at a desired timing as a static image. Note that during image capture, obstructions that impede image capture of the entire marker 31 must not exist between the camera 30 serving as the image input device and the disposed marker 31.

Next, in step S510, the marker position detection unit 16 identifies the feature points included in the marker 31 from the image obtained via the camera 30 by image processing, and outputs the coordinates thereof.

In the first embodiment, as shown in FIG. 2, the plurality of feature points included in the marker 31 are formed from regularly arranged black dots. Accordingly, the marker position detection unit 16 outputs respective gravitational center positions of the plurality of black dots as the coordinates of the feature points. The camera 30 includes the distortion correction unit, and therefore, when the lens of the camera 30 is distorted, an image on which the distortion has been corrected can be output at this time.

Furthermore, instead of using image processing to specify the coordinates of the feature points of the marker 31, an input image display device and a coordinate specification device may be provided, and the positions of the feature points may be specified by the operator while viewing a screen.

Next, in step S511, the vehicle-based relative camera position calculation unit 15 calculates the position and the attitude of the camera 30 on the vehicle coordinate system by comparing the positions of the feature points included in the marker on the image, these positions having been detected by the marker position detection unit 16 in step S510, and the positions of the feature points included in the marker on the vehicle coordinate system, these positions having been calculated by the vehicle-based relative marker position calculation unit 14 in step S508.

More specifically, the vehicle-based relative camera position calculation unit 15 can set up simultaneous equations from the correspondence between the image coordinates of the group of feature points and the coordinates thereof on the vehicle coordinate system, and calculate the position and attitude of the camera 30 so as to minimize the error between the simultaneous equations.

Furthermore, the vehicle-based relative camera position calculation unit 15 stores the calculated position and attitude of the camera in the calibration parameter storage unit 17 as external calibration parameters of the camera. The series of processing procedures is then terminated.

The calibration method described above may be organized into following procedures A1 to A9.

(Procedure A1) When the marker 31 is set as a rigid body disposed on the ground, $M_1$, $M_2$ are set as two points having known coordinates on a rigid body-based coordinate system.

(Procedure A2) Points dropped onto the ground vertically from two specific points on the vehicle 1 are set respectively as the point $V_1$ and the point $V_2$.

(Procedure A3) The four distances $M_1V_1$, $M_1V_2$, $M_2V_1$, and $M_2V_2$ between the respective sets of two points are actually measured on the basis of the points $M_1$ and $M_2$ and the points $V_1$ and $V_2$.

(Procedure A4) The straight line $V_1V_2$ on the ground is set to be parallel to the x axis of the vehicle coordinate system, and the coordinates of the point $M_1$ and the point $M_2$ based on the point $V_2$ are determined from the actual measurement values obtained in procedure A3 using trilateration.

(Procedure A5) The distance $M_1M_2$ is calculated from the coordinate values of the point $M_1$ and the point $M_2$, determined in procedure A4, and set as the calculated value. Further, the distance $M_1M_2$ is calculated from coordinate values on the rigid body-based coordinate system, and set as the design value.

(Procedure A6) When the difference between the calculated value and the design value is not within an allowable threshold, the routine returns to procedure A3, where actual measurement is performed again. When the difference between the calculated value and the design value is within the allowable threshold, on the other hand, the routine advances to the next procedure A7.

(Procedure A7) The coordinates of the two points $M_1$, $M_2$ based on $V_2$, determined in procedure A4, are converted into coordinates on the vehicle coordinate system, and the coordinates of the group of feature points included in the marker on the vehicle coordinate system are determined.

(Procedure A8) The camera 30 mounted on the vehicle 1 captures a static image of the marker, and the positions on the image of the group of feature points included in the marker are detected from the static image as image coordinates.

(Procedure A9) The position and attitude of the camera 30 on the vehicle coordinate system are calculated so that the image coordinates of the group of feature points included in the marker, detected in procedure A8, match the coordinates thereof on the vehicle coordinate system, determined in procedure A7. The calculated position and attitude are then stored in the storage unit as the calibration parameters.

Note that in order to simplify the calculations, following limitations are applied to procedures A1 to A9.

(Limitation 1) Regarding the two points relating to the vehicle, when the coordinates of the point M and the point $M_2$ are determined using trilateration, the coordinates of both points are determined as coordinate values relating to the point $V_1$ and the point $V_2$. Instead, however, the coordinate value of one of the point $M_1$ and the point $M_2$ may be determined as a coordinate value relating to the point $V_1$ and the point $V_2$, and the other coordinate value may be determined as a coordinate value relating to two different points to the point $V_1$ and the point $V_2$.

(Limitation 2) Regarding the direction of the straight line $V_1V_2$, the straight line $V_1V_2$ is set to be parallel to the x axis of the vehicle coordinate system, but does not necessarily have to be parallel to the x axis.

(Limitation 3) Regarding the group of feature points included in the marker, in procedure A7 to procedure A9, the calibration parameters are determined by aligning the positions of the image coordinates of the group of feature points included in the marker and the coordinates thereof on the vehicle coordinate system, but the group of feature points included in the marker does not necessarily have to be used. Instead of using the group of feature points included in the marker, the calibration parameters may be determined by aligning the positions of the image coordinates of the two points $M_1$, $M_2$ relative to the rigid body and the coordinates thereof on the vehicle coordinate system.

Hence, typical procedures executed in a case where limitations 1 to 3 are not applied take the form of procedures B1 to B9, described below. In the following description, the two points having known coordinates on the rigid body-based coordinate system are set as R0 and R1, and two sets of points defined as a vehicle-based coordinate system are set as V0, V1 and V2, V3. Here, the points R0, R1 correspond to points constituting a plurality of rigid body-based points, while the points V0, V1, V2, and V3 correspond to points constituting a plurality of vehicle-based points.

(Procedure B1) When the marker 31 is set as the rigid body disposed on the ground, R0, R1 are set as two points having known coordinates on the rigid body-based coordinate system.

(Procedure B2) Points dropped onto the ground vertically from two specific points on the vehicle 1 are set respectively as the point V0 and the point V1. Further, points dropped onto the ground vertically from another two specific points on the vehicle 1 are set respectively as the point V2 and the point V3.

(Procedure B3) Two distances R0V0, R0V1 between two points are actually measured on the basis of the point R0 and the points V0 and V1. Similarly, two distances R1V2, R1V3 between two points are actually measured on the basis of the point R1 and the points V2 and V3.

(Procedure B4) The coordinates of the point R0 on a V0-based coordinate system having V0 as the origin and a straight line V0V1 as one of the axes are determined from the actual measurement values obtained in procedure B3 using trilateration, and the determined coordinates are set as $(R0_{x\_V0}, R0_{y\_V0})$. Similarly, the coordinates of the point R1 on a V2-based coordinate system having V2 as the origin and a straight line V2V3 as one of the axes are determined from the actual measurement values obtained in procedure B3 using trilateration, and the determined coordinates are set as $(R1_{x\_V0}, R1_{y\_V0})$.

Further, the determined coordinates $(R0_{x\_V0}, R0_{y\_V0})$ and $(R1_{x\_V0}, R1_{y\_V0})$ are converted into coordinates on a vehicle-based coordinate system having a common origin, whereby coordinates $(R0_{x\_true}, R0_{y\_true})$ and $(R1_{x\_true}, R1_{y\_true})$ are obtained.

Figure 7:
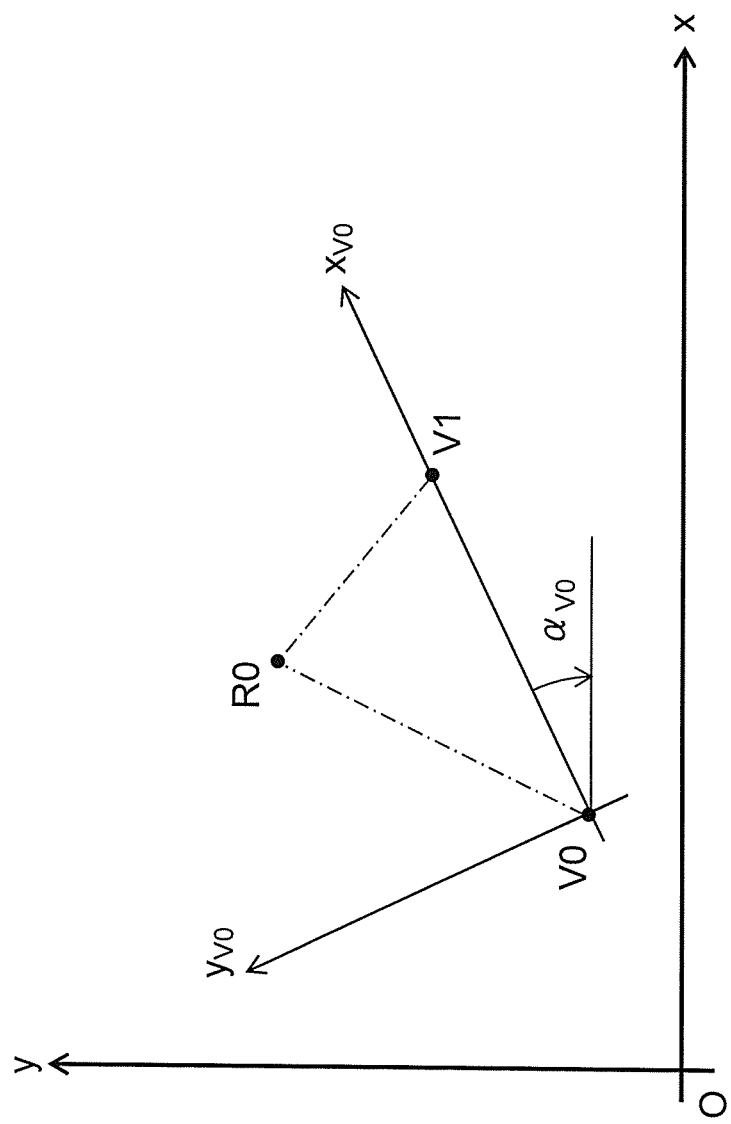
FIG. 7 is an illustrative view showing a method of determining coordinates of a point R0 on a vehicle-based coordinate system in procedure B4 according to the first embodiment of this invention.

Here, procedure B4 will be described in further detail using a drawing and formulae. FIG. 7 is an illustrative view showing a method of determining the coordinates of the point R0 on the vehicle-based coordinate system in procedure B4 according to the first embodiment of this invention. Here, values of V0 and V1 on the V0-based coordinate system are set respectively as $$V0 = (V0_x, V0_y)$$

$$V1 = (V1_x, V1_y).$$

An angle $\alpha_{V0}$ formed by the V0-based coordinate system having V0 as the origin and the vehicle coordinate system having O as the origin is determined from Equation (4), shown below.

[Math. 3]

$$\alpha_{V0} = -\tan^{-1}\frac{V1_y - V0_y}{V1_x - V0_x} \quad (4)$$

The coordinates R0 true of the point R0 on the vehicle-based coordinate system can then be determined from Equation (5), shown below.

[Math. 4]

$$R0_{true} = \begin{pmatrix} \cos\alpha_{V0} & \sin\alpha_{V0} \\ -\sin\alpha_{V0} & \cos\alpha_{V0} \end{pmatrix}\begin{pmatrix} R0_{x\_V0} \\ R0_{y\_V0} \end{pmatrix} + \begin{pmatrix} V0_x \\ V0_y \end{pmatrix} \quad (5)$$

The coordinates R1 true of the point R1 on the vehicle-based coordinate system can be determined in a similar manner.

(Procedure B5) The distance R0R1 is calculated from the coordinate values of the point R0 and the point R1, determined in procedure B4, and set as a calculated value. Further, the distance R0R1 is calculated from coordinate values relating to the marker 31 on the rigid body-based coordinate system, which are stored in advance in the marker shape parameter storage unit 11, and set as a design value.

(Procedure B6) When the difference between the calculated value and the design value is not within an allowable threshold, the routine returns to procedure B3, where actual measurement is performed again. When the difference between the calculated value and the design value is within the allowable threshold, on the other hand, the routine advances to the next procedure B7.

(Procedure B7) The camera 30 mounted on the vehicle 1 captures a static image of the marker, and the positions of R0 and R1 within the marker are detected from the static image as image coordinates.

(Procedure B8) The position and attitude of the camera 30 on the vehicle coordinate system are calculated so that the image coordinates of the two points R0, R1, detected in procedure B7, match the coordinates thereof on the vehicle coordinate system, determined in procedure B4. The calculated position and attitude are then stored in the calibration parameter storage unit 17 as the calibration parameters.

Figure 8:
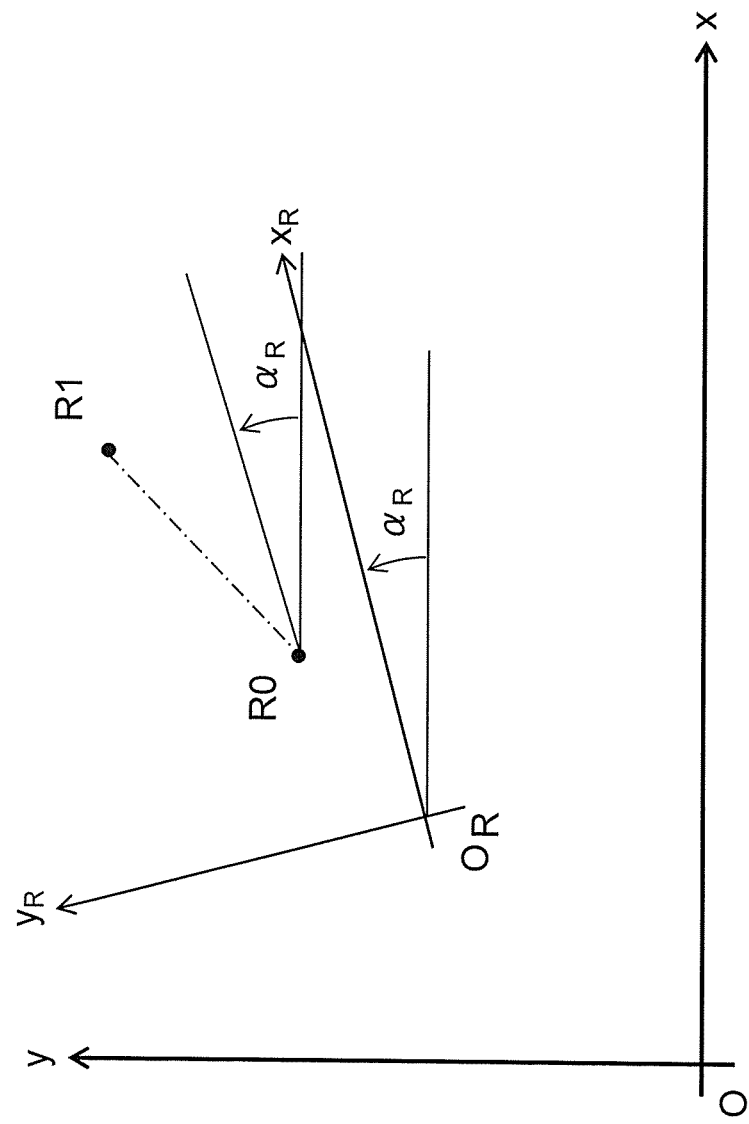
FIG. 8 is an illustrative view showing a method of determining calibration parameters in procedure B8 according to the first embodiment of this invention.

Here, procedure B8 will be described in further detail using a drawing and formulae. FIG. 8 is an illustrative view showing a method of determining the calibration parameters in procedure B8 according to the first embodiment of this invention. Here, values of the image coordinates of R0 and R1 are set respectively as $R0 = (R0_{x\_R}, R0_{y\_R})$ $R1 = (R1_{x\_R}, R1_{y\_R})$.

A relative attitude $\alpha_R$ corresponding to an angle formed by the image coordinates having $O_R$ as an origin and the vehicle coordinate system having O as the origin is determined from Equation (6), shown below.

[Math. 5]

$$\alpha_R = \tan^{-1}\frac{R1_{y\_true} - R0_{y\_true}}{R1_{x\_true} - R0_{x\_true}} - \tan^{-1}\frac{R1_{y\_R} - R0_{y\_R}}{R1_{x\_R} - R0_{x\_R}} \quad (6)$$

Further, a relative position of the origin $O_R$ can be determined from Equation (7), shown below.

[Math. 6]

$$O_R = \begin{pmatrix} R0_{x\_true} \\ R0_{y\_true} \end{pmatrix} - \begin{pmatrix} \cos\alpha_R & -\sin\alpha_R \\ \sin\alpha_R & \cos\alpha_R \end{pmatrix}\begin{pmatrix} R0_{x\_R} \\ R0_{y\_R} \end{pmatrix} \quad (7)$$

As a result, the vehicle-based relative camera position calculation unit 15 can determine the relative attitude $\alpha_R$ and the relative position of the origin $O_R$ as the calibration parameters.

Note that in order to simplify the calculations in procedures B1 and B2, the point R0, the point R1, and the points V0 to V3 are all defined as points in an identical plane to the ground. According to this invention, however, these points may be defined as points above the ground on a three-dimensional coordinate system. In this case, coordinate values corresponding to those of procedures B1 and B2 can be calculated by replacing the points on a two-dimensional plane on the ground with points defined within a three-dimensional coordinate system.

Figure 9:
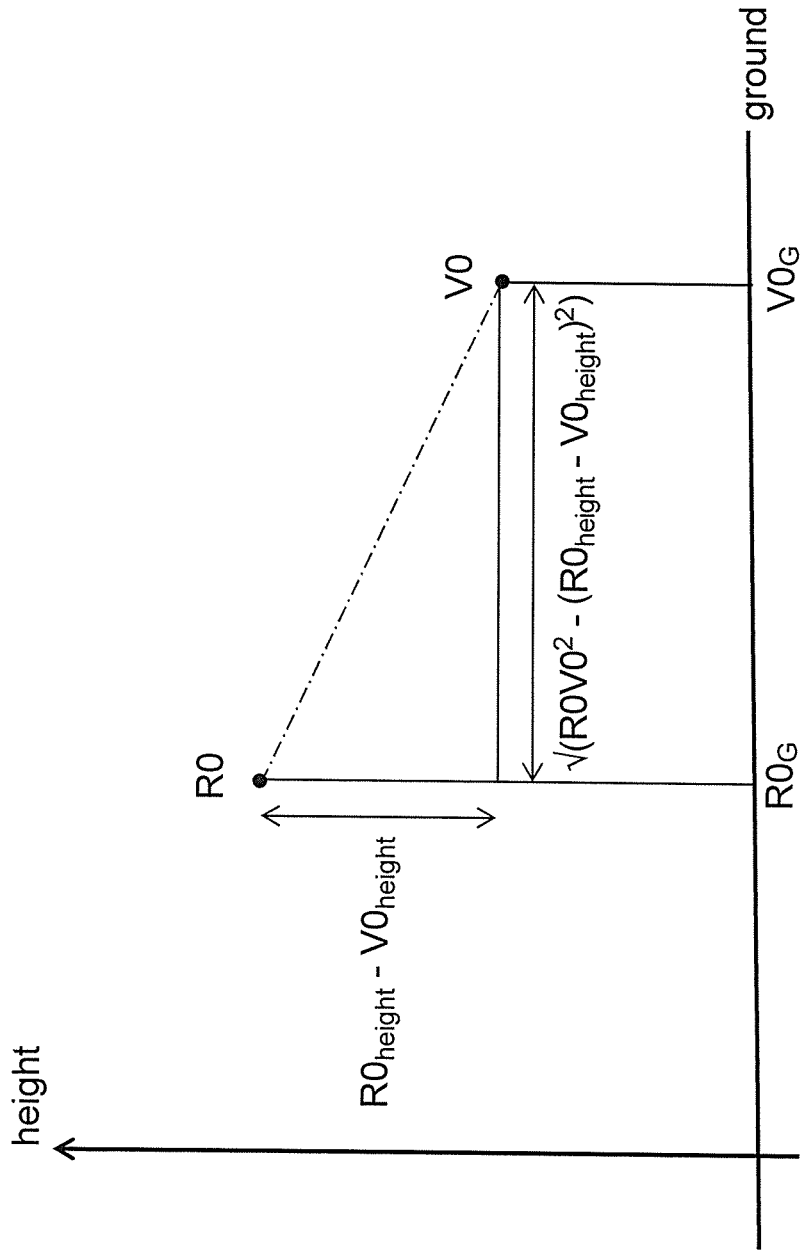
FIG. 9 is an illustrative view showing a method of replacing points on a two-dimensional plane with points on a three-dimensional coordinate system according to the first embodiment of this invention.

FIG. 9 is an illustrative view showing a method of replacing points on a two-dimensional plane with points on a three-dimensional coordinate system according to the first embodiment of this invention. In FIG. 9, the point R0 is defined at a height $R0_{height}$ from the ground, and the point V0 is defined at a height $V0_{height}$ from the ground. Further, $R0_G$ is a point defined by dropping the point R0 vertically onto the ground, and $V0_G$ is a point defined by dropping the point V0 vertically onto the ground.

The abscissa in FIG. 9 is an axis that includes a straight line linking the point $R0_G$ to the point $V0_G$ on a horizon plane, while the ordinate shows a height direction.

A distance between R0 and V0 is determined as an actual measurement value. Further, a distance between R0 and V0 in the height direction can be determined from $R0_{height} - V0_{height}$.

Accordingly, a distance between R0 and V0 in the direction of the abscissa, or in other words a distance between $R0_G$ and $V0_G$, can be determined using Pythagoras' theorem from $\sqrt{((R0V0)^2 - (R0_{height} - V0_{height})^2)}$.

The distance on the horizon plane between another two points can be determined similarly using Pythagoras' theorem.

Hence, according to the first embodiment, the calibration parameters of the camera mounted on the vehicle can be determined easily and quickly using calculation processing by defining the position in which to dispose the marker relative to the vehicle in accordance with measurement values of four distances obtained from combinations of two points on the vehicle-based coordinate system and two points on the rigid body-based coordinate system.

More specifically, by employing a trilateration method, a relative positional relationship between the vehicle and the marker can be determined by measuring the four distances. Moreover, only ground distances are measured, and therefore the calibration operation can be performed quickly and easily using a plumb bob and a single tape measure, without the need for special devices such as a three-dimensional measuring instrument or a marking device.

Further, by setting two points on the vehicle-based coordinate system so that the straight line linking the two points is parallel to one of the axes of the vehicle coordinate system, coordinate conversion can be performed by means of parallel movement processing alone. Hence, a floating point calculation is not required, and therefore the danger of a trigonometric function calculation becoming an approximate calculation does not exist. As a result, the calculation precision of the coordinate conversion can be improved.

Furthermore, as described above using FIG. 9, even when points having three-dimensional height are employed instead of points on the ground, the calibration parameters can be determined by converting the points having three-dimensional height into points on the ground using Pythagoras' theorem.

Further, a configuration is provided to determine whether or not an absolute value of the difference between the design value of the distance on the rigid body-based coordinate system and the calculated value of the distance on the vehicle-based coordinate system is within a specific threshold. Moreover, a configuration for displaying the determination result and a configuration for displaying the measurement locations in the form of icons overlaid onto the captured image are provided.

Hence, the operator can identify a measurement error or an input error reliably, input accurate measurement data while following displayed guidance, and calculate calibration parameters based on these accurate measurement data.

Note that when the icons are displayed by the display unit $22c$ so as to be overlaid onto the captured image, as shown in FIG. 4, the position of the marker within the camera image can be detected using image processing, and the display positions of the icons can be corrected to accurate positions in accordance with the detection result. In other words, the display positions of the icons can be corrected to accurate positions regardless of the position in which the host vehicle is stopped or the condition in which the camera is mounted.

According to the first embodiment, therefore, it is possible to realize a calibration method with which there is no need to use a specialist device to dispose the marker, and the calibration parameters can be determined with a high degree of precision and in a smaller number of steps than with a conventional method.

Second Embodiment

In the first embodiment, a method of calculating the calibration parameters in a case where the two points on the marker 31 relating to the host vehicle 1 are disposed two-dimensionally on the ground was described. In a second embodiment, on the other hand, a method of calculating the calibration parameters in a case where three points on the marker 31 are disposed three-dimensionally relative to the host vehicle 1 will be described.

Figure 10:
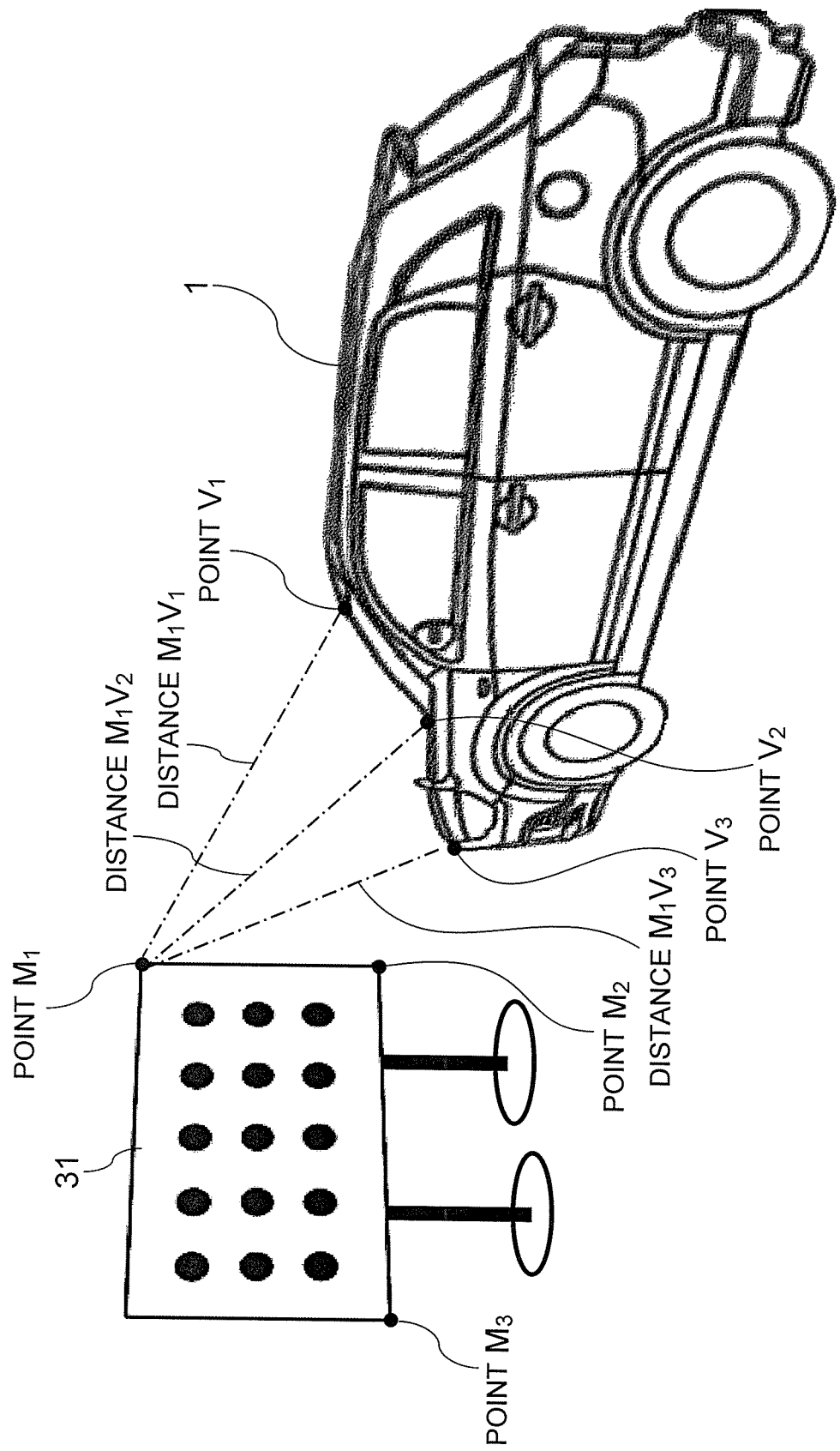
FIG. 10 is a schematic external view illustrating calibration parameter calculation executed by a calibration device according to a second embodiment of this invention.

FIG. 10 is a schematic external view illustrating calibration parameter calculation executed by a calibration device according to the second embodiment of this invention. FIG. 10 shows an example of a case in which the marker 31 is disposed three-dimensionally relative to the host vehicle 1.

In this case, as long as the marker 31 stands perfectly perpendicular to the ground or the like, the relative position of the marker 31 relative to the host vehicle 1 can be determined by implementing a method such as that of the first embodiment on the part of the marker that touches the ground.

When this is not the case, however, or in other words when it is not known whether or not the marker 31 stands perfectly perpendicular to the ground or when the marker 31 does not touch the ground, the relative position and relative attitude of the marker 31 must be determined three-dimensionally. Hence, in the second embodiment, an example in which the method of the first embodiment is expanded to three dimensions will be described.

Figure 11:
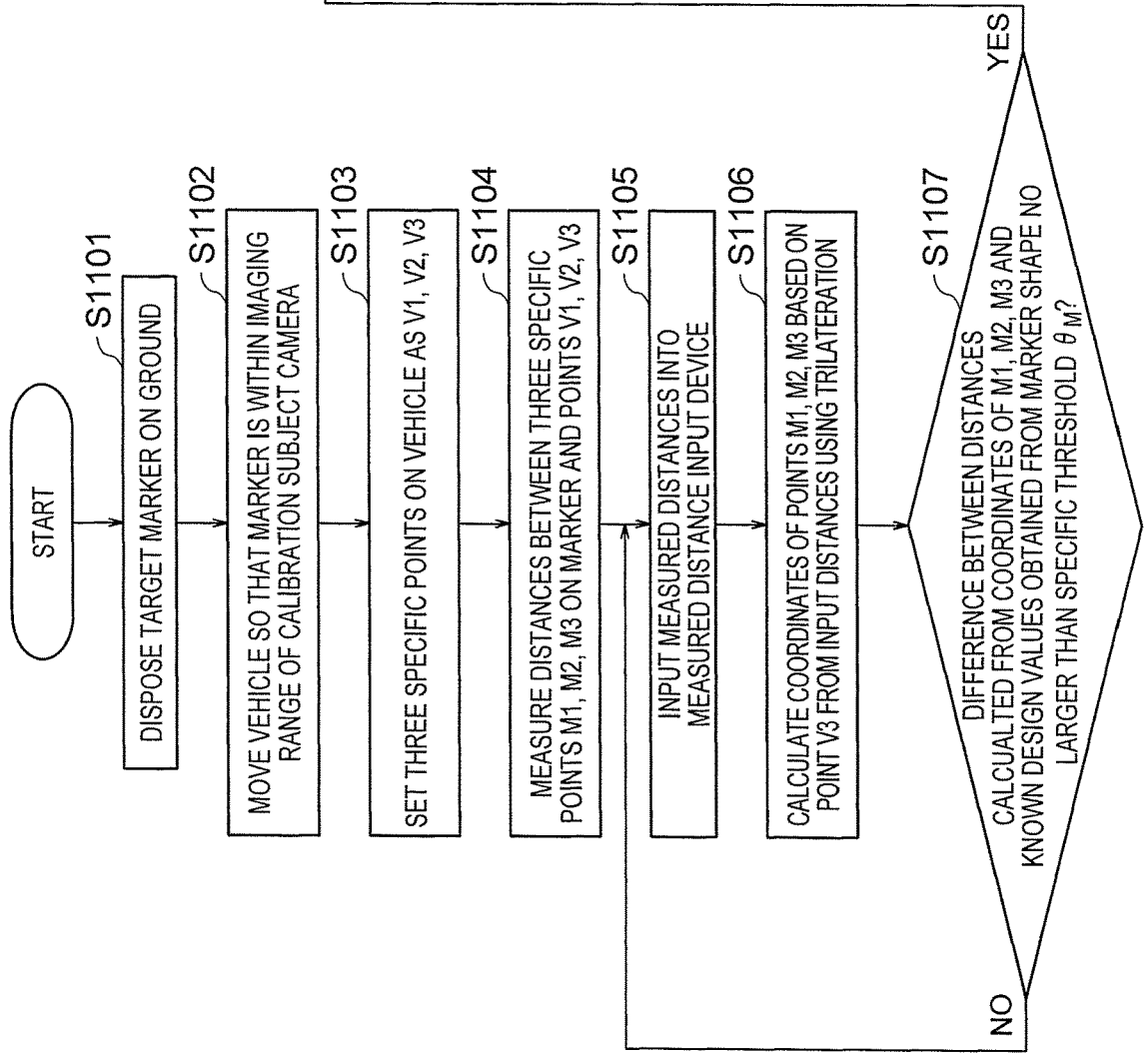
FIG. 11 is a flowchart showing a series of processing procedures of a calibration method according to the second embodiment of this invention.

FIG. 11 is a flowchart showing a series of processing procedures of the calibration method according to the second embodiment of this invention. Here, the following description will focus on differences with the flowchart of the first embodiment, shown in FIG. 5.

First, in step S1101, the operator disposes the marker 31, which includes a plurality of feature points, on the ground within the imaging range of the camera 30.

At this time, the position of the marker 31 and the relative position of the host vehicle 1 do not yet have to be known accurately. However, the position in which to dispose the marker 31 is set roughly in advance in order to stabilize the precision of the calibration calculation that is executed using the image captured by the camera 30. Note that in the second embodiment, in contrast to the first embodiment, the marker 31 does not have to be disposed on the ground in front of the host vehicle 1.

Next, in step S1102, the operator moves the vehicle 1 so that the marker 31 is within the actual imaging range of the camera 30 to be calibrated, which is mounted on the vehicle 1. At this time, the operator can determine the position in which to stop the vehicle 1 while referring to the captured image displayed by the display unit $22c$ of the measured distance input device 20.

Next, in step S1103, the operator sets a point $V_1$, a point $V_2$, and a point $V_3$ as three specific points on the vehicle 1. Note that in contrast to the first embodiment, the three specific points according to the second embodiment do not necessarily have to be set on the ground.

Next, in step S1104, the operator measures distances between a point $M_1$, a point $M_2$, and a point $M_3$ on the marker and the point $V_1$, the point $V_2$, and the point $V_3$ on the vehicle body using a tape measure or the like. More specifically, nine distances, namely distances between $M_1$ and $V_1$, between $M_1$ and $V_2$, between $M_1$ and $V_3$, between $M_2$ and $V_1$, between $M_2$ and $V_2$, between $M_2$ and $V_3$, between $M_3$ and $V_1$, between $M_3$ and $V_2$, and between $M_3$ and $V_3$, are measured. Note that only three distances, namely $M_1V_1$, $M_1V_2$, and $M_1V_3$, are shown as examples in FIG. 10.

Next, in step S1105, the operator inputs the numerical values of the nine measured distances via the measured distance input device 20. More specifically, the operator inputs the measurement results for the nine distances by setting numerical values corresponding respectively to the nine items of the input unit $22a$.

Next, in step S1106, the trilateration calculation unit 12 of the calibration parameter calculation device 10 calculates the coordinates of the point $M_1$, the point $M_2$, and the point $M_3$ based on the point $V_3$ from the numerical values of the nine distances input therein via the measured distance input device 20.

In the first embodiment, the coordinates of $M_1$ and $M_2$ based on $V_2$ are calculated by trilateration using the fact that a triangle is determined uniquely from the lengths of the three sides of the triangle. In the second embodiment, on the other hand, the coordinates of $M_1$, $M_2$, and $M_3$ based on $V_3$ are calculated using the fact that a triangular pyramid is determined uniquely from the lengths of the six sides of the triangular pyramid.

Next, in step S1107, the input error determination unit 13 calculates a distance $M_1M_2$, a distance $M_1M_3$, and a distance $M_2M_3$ using the coordinates of the point $M_1$, the point $M_2$, and the point $M_3$, determined by the trilateration calculation unit 12. Further, the input error determination unit 13 reads design values of the distance $M_1M_2$, the distance $M_1M_3$, and the distance $M_2M_3$, which form parts of the outer shape of the marker 31, from the marker shape parameter storage unit 11.

Note that in the following description, the design values of the distance $M_1M_2$, the distance $M_1M_3$, and the distance $M_2M_3$, will be distinguished from the distance $M_1M_2$, the distance $M_1M_3$, and the distance $M_2M_3$ obtained as calculated values by being referred to respectively as a distance $M_1M_{2truth}$, a distance $M_1M_{3truth}$, and a distance $M_2M_{3truth}$.

The input error determination unit 13 then determines whether or not differences between corresponding calculated values and design values are within the specific threshold $\theta_M$.

When the input error determination unit 13 determines that an input error has not occurred, this means that the measurement values input by the operator in step S1105 are valid. Accordingly, the routine advances to processing executed by the vehicle-based relative camera position calculation unit in step S1108.

When the input error determination unit 13 determines that an input error has occurred, on the other hand, this means that the measurement values input by the operator in step S1105 are invalid. Accordingly, as shown in FIG. 4, the operator is notified of this fact and the value of the error via the output unit 22b of the measured distance input device 20, whereupon the routine returns to the processing of step S1105, where the operator is prompted to perform re-measurement and re-input processing.

Note that in the first embodiment, only the coordinates of the two points $M_1$, $M_2$ are determined on the marker 31, and therefore the occurrence of an input error is determined using only the single distance $M_1M_2$. In the second embodiment, on the other hand, the coordinates of the three points $M_1$, $M_2$, $M_3$ are determined, and therefore the occurrence of an input error can be determined individually with respect to the three distances $M_1M_2$, $M_2M_3$, and $M_3M_1$.

At this time, a case in which input errors are determined to have occurred in relation to the distance $M_2M_3$ and the distance $M_3M_1$ but an input error is determined not to have occurred in relation to the distance $M_1M_2$, for example, may arise. In this case, the distances relating to the points $M_1$ and $M_2$ are highly likely to be accurate, and it is therefore assumed that by re-measuring only the three distances relating to $M_3$, namely $V_1M_3$, $V_2M_3$, and $V_3M_3$, the input error determination is likely to disappear. As a result, re-measurement can be performed more efficiently than in a case where all of the nine pieces of data are re-measured.

Next, when the routine advances to step S1108, the vehicle-based relative marker position calculation unit 14 converts the coordinates of the point $M_1$, the point $M_2$, and the point $M_3$ based on the point $V_3$, these coordinates having been determined by the trilateration calculation unit 12, into coordinates based on the vehicle coordinates.

Note that in the first embodiment, coordinate conversion is performed by two-dimensional rotation and translation alone, whereas in the second embodiment, coordinate conversion is performed using three-dimensional rotation and translation.

Next, in step S1109, the operator uses the camera 30 to capture an image including the marker 31 at a desired timing as a static image. Note that during image capture, obstructions that impede image capture of the entire marker 31 must not exist between the camera 30 serving as an image input device and the disposed marker 31.

Next, in step S1110, the marker position detection unit 16 identifies the feature points included in the marker 31 from the image obtained via the camera 30 by image processing, and outputs the coordinates thereof.

Next, in step S1111, the vehicle-based relative camera position calculation unit 15 calculates the position and the attitude of the camera 30 on the vehicle coordinate system from the positions of the feature points included in the marker on the image, these positions having been detected by the marker position detection unit 16 in step S1110, and the positions of the feature points included in the marker on the vehicle coordinate system, these positions having been calculated by the vehicle-based relative marker position calculation unit 14 in step S1108.

More specifically, the vehicle-based relative camera position calculation unit 15 can set up simultaneous equations from the correspondence between the image coordinates of the group of feature points and the coordinates thereof on the vehicle coordinate system, and calculate the relative attitude of the camera 30 and the relative position of the origin thereof so as to minimize the error between the simultaneous equations.

Furthermore, the vehicle-based relative camera position calculation unit 15 stores the calculated relative attitude of the camera 30 and the relative position of the origin thereof in the calibration parameter storage unit 17 as the external calibration parameters of the camera 30. The series of processing procedures is then terminated.

Hence, according to the second embodiment, the calibration parameters of the camera mounted on the vehicle can be determined easily and quickly using calculation processing by defining the position in which to dispose the marker relative to the vehicle three-dimensionally in accordance with measurement values of nine distances obtained from combinations of three points on the vehicle and three points on the marker.

In particular, the calibration parameters of the camera mounted on the vehicle can be determined easily and quickly by expanding the calculation processing from two dimensions to three dimensions even when a marker that does not touch the ground is used.

According to the second embodiment, therefore, it is possible to realize a calibration method in which the points specified on the rigid body-based coordinate system and the vehicle-based coordinate system are expanded to a three-dimensional region, and with which there is no need to use a specialist device in order to dispose the marker and the calibration parameters can be determined in a smaller number of steps than with a conventional method.

What is claimed is:

1. A calibration device for measuring relative positions and relative attitudes of a rigid body disposed on ground and a vehicle, the calibration device comprising:
a measured distance input device that receives, based on an input operation performed by an operator, respective measurement values of respective distances between two points on the basis of a plurality of vehicle-based points having known coordinates on a vehicle-based coordinate system that is defined in accordance with a stopping position of the vehicle and includes an origin and two axes located on the ground, and a plurality of rigid body-based points having known coordinates on a rigid body-based coordinate system that is defined by a disposal location of a marker serving as the rigid body disposed on the ground and includes an origin and two axes located on the ground, the two points being constituted by a combination of one of the plurality of vehicle-based points and one of the plurality of rigid body-based points; and a calibration parameter calculation device that calculates a relative attitude of the rigid body-based coordinate system and a relative position of the origin thereof on the vehicle-based coordinate system as calibration parameters on the basis of the respective measurement values and a captured image including the marker, which is captured by a camera that is mounted on the vehicle and subjected to calibration, the calibration parameter calculation device comprising:
a coordinate calculator that calculates coordinates of the plurality of rigid body-based points on the vehicle-based coordinate system from the respective measurement values; and
a parameter calculator that calculates the relative attitude and the relative position of the origin as the calibration parameters from a correspondence relationship between positions of image coordinates of the plurality of rigid body-based points included in the captured image and the coordinates of the plurality of rigid body-based points on the vehicle-based coordinate system.

2. The calibration device according to claim 1, wherein the plurality of vehicle-based points are constituted by a point V0, a point V1, a point V2, and a point V3 having known ground coordinates on the vehicle-based coordinate system, the plurality of rigid body-based points are constituted by a point R0 and a point R1 having known ground coordinates on the rigid body-based coordinate system,
the measured distance input device receives four measurement values comprising a measurement value of a distance V0R0 between the point V0 and the point R0, a measurement value of a distance V1R0 between the point V1 and the point R0, a measurement value of a distance V2R1 between the point V2 and the point R1, and a measurement value of a distance V3R1 between the point V3 and the point R1, as the respective measurement values based on the input operation performed by the operator,
the coordinate calculator comprises:
a trilateration calculation unit that calculates coordinates of the point R0 on a V0-based coordinate system having the point V0 as an origin and a straight line linking the point V0 to the point V1 as one axis, and coordinates of the point R1 on a V2-based coordinate system having the point V2 as an origin and a straight line linking the point V2 to the point V3 as one axis, from the four measurement values using a trilateration method; and
a coordinate conversion unit that converts the coordinates of the point R0 on the V0-based coordinate system into coordinates on the vehicle-based coordinate system by rotation and parallel movement, and converts the coordinates of the point R1 on the V2-based coordinate system into coordinates on the vehicle-based coordinate system by rotation and parallel movement,
wherein the parameter calculator calculates the relative attitude and the relative position of the origin as the calibration parameters from a correspondence relationship between positions of image coordinates of the point R0 and the point R1 included in the captured image and the coordinates of the point R0 and the point R1 on the vehicle-based coordinate system.

3. The calibration device according to claim 2, wherein the coordinate conversion unit executes coordinate conversion by parallel movement alone when the point V2 and the point V3 are set to be identical to the point V0 and the point V1, respectively, and the point V0 and the point V1 are set such that the straight line linking the point V0 to the point V1 is parallel to one of the two axes of the vehicle-based coordinate system.

4. The calibration device according to claim 2, wherein, when the vehicle-based coordinate system and the rigid body-based coordinate system are both three-dimensional coordinate systems having a third axis in a height direction from the ground, and at least one of six points, which comprise the point V0, the point V1, the point V2, the point V3, the point R0, and the point R1, is a known point not located on the ground, the trilateration calculation unit determines points obtained by dropping the point V0, the point V1, the point V2, the point V3, the point R0, and the point R1 vertically onto the ground as a point $V0_G$, a point $V1_G$, a point $V2_G$, a point $V3_G$, a point $R0_G$, and a point $R1_G$, respectively, and calculates coordinates of the point $R0_G$ on a $V0_G$-based coordinate system and coordinates of the point $R1_G$ on a $V2_G$-based coordinate system using a trilateration method,
the coordinate conversion unit executes coordinate conversion using the coordinates of the point $R0_G$ on the $V0_G$-based coordinate system and the coordinates of the point $R1_G$ on the $V2_G$-based coordinate system, calculated by the trilateration calculation unit, and
the parameter calculator calculates the calibration parameters using values obtained as a result of the coordinate conversion executed by the coordinate conversion unit.

5. The calibration device according to claim 2, wherein the calibration parameter calculation device further comprises:
an input error determination unit that calculates a distance between the point R0 and the point R1 on the vehicle-based coordinate system from the respective coordinates thereof on the vehicle-based coordinate system, the coordinates having been determined by the coordinate conversion unit, as a calculated value, calculates a distance between the point R0 and the point R1 on the rigid body-based coordinate system from the respective coordinates thereof on the rigid body-based coordinate system as a design value, determines whether or not an absolute value of a difference between the calculated value and the design value is smaller than a preset threshold, and transmits a determination result to the measured distance input device,
wherein the measured distance input device, having determined from the received determination result that the absolute value equals or exceeds the preset threshold, causes a display unit to output a message prompting the operator to reset the four measurement values.

6. The calibration device according to claim 2, wherein the measured distance input device comprises:
an input unit to set numerical values of the four measurement values; and
a display unit to display the captured image captured by the camera on a screen, the captured image including a part of the vehicle and the marker.

7. The calibration device according to claim 6, wherein the measured distance input device causes the display unit to display an icon that is overlaid on the captured image so as to indicate a measurement location corresponding to an item, for which a numerical value has been set on the input unit, among the four measurement values.

8. The calibration device according to claim 7, wherein, when the icon is to be overlaid on the captured image, the measured distance input device detects a position of the marker within the captured image by implementing image processing on the captured image, and overlays the icon on the captured image after correcting a display position of the icon in accordance with a detection result.

9. The calibration device according to claim 1, wherein the plurality of vehicle-based points are constituted by three groups of points comprising a first group comprising three points constituted by point V0, a point V1, and a point V2, a second group comprising three points constituted by a point V3, a point V4, and a point V5, and a third group comprising three points constituted by a point V6, a point V7, and a point V8, the three groups having known three-dimensional (3D) coordinates on the vehicle-based coordinate system and the three points of each group not existing on a straight line, the plurality of rigid body-based points are constituted by a fourth group of points comprising three points constituted by a point R0, a point R1, and a point R2, the fourth group having known 3D coordinates on the rigid body-based coordinate system and the three points of the fourth group not existing on a straight line, the measured distance input device receives nine measurement values comprising, measurement values of respective distances between the point R0 and the three points constituting the first group, measurement values of respective distances between the point R1 and the three points constituting the second group, and measurement values of respective distances between the point R2 and the three points constituting the third group, as the respective measurement values based on the input operation performed by the operator, the coordinate calculator comprises:
a trilateration calculation unit that calculates coordinates of the point R0 on a 3D V0-based coordinate system having the point V0 as an origin, a straight line linking the point V0 to the point V1 as a first axis, and a second axis on a plane that includes the three points constituting the first group, coordinates of the point R1 on a 3D V3-based coordinate system having the point V3 as an origin, a straight line linking the point V3 to the point V4 as a first axis, and a second axis on a plane that includes the three points constituting the second group, and coordinates of the point R2 on a 3D V6-based coordinate system having the point V6 as an origin, a straight line linking the point V6 to the point V7 as a first axis, and a second axis on a plane that includes the three points constituting the third group, from the nine measurement values using a trilateration method; and a coordinate conversion unit that converts the coordinates of the point R0 on the 3D V0-based coordinate system into coordinates on the vehicle-based coordinate system by rotation and parallel movement, converts the coordinates of the point R1 on the 3D V3-based coordinate system into coordinates on the vehicle-based coordinate system by rotation and parallel movement, and converts the coordinates of the point R2 on the 3D V6-based coordinate system into coordinates on the vehicle-based coordinate system by rotation and parallel movement, wherein the parameter calculator calculates the relative attitude and the relative position of the origin as the calibration parameters from a correspondence relationship between positions of image coordinates of the point R0, the point R1, and the point R2 included in the captured image and the coordinates of the point R0, the point R1, and the point R2 on the vehicle-based coordinate system.

10. A calibration method for measuring relative positions and relative attitudes of a rigid body disposed on Ale ground and a vehicle, the calibration method comprising:
a first step in which respective coordinates of a plurality of rigid body-based points having known coordinates on a rigid body-based coordinate system are stored in advance in a storage unit, the rigid body-based coordinate system being defined by a disposal position of a marker serving as the rigid body disposed on the ground and including an origin and two axes located on the ground;

a second step in which measurement values of respective distances between two points are received, via a measured distance input device based on an input operation performed by an operator, on the basis of the plurality of rigid body-based points and a plurality of vehicle-based points having known coordinates on a vehicle-based coordinate system that is defined in accordance with a stopping position of the vehicle and includes an origin and two axes located on the ground, the two points being constituted by a combination of one of the plurality of vehicle-based points and one of the plurality of rigid body-based points;

a third step in which a captured image including the marker, which is captured by a camera that is mounted on the vehicle and subjected to calibration, is obtained;

a fourth step in which coordinates of the plurality of rigid body-based points on the vehicle-based coordinate system are calculated from the respective measurement values; and a fifth step in which a relative attitude of the rigid body-based coordinate system and a relative position of the origin thereof on the vehicle-based coordinate system are calculated as calibration parameters from a correspondence relationship between positions of image coordinates of the plurality of rigid body-based points included in the captured image and the coordinates of the plurality of rigid body-based points on the vehicle-based coordinate system, the coordinates having been stored in the storage unit.

11. The calibration method according to claim 10, wherein the plurality of vehicle-based points are constituted by a point V0, a point V1, a point V2, and a point V3 having known ground coordinates on the vehicle-based coordinate system, the plurality of rigid body-based points are constituted by a point R0 and a point R1 having known ground coordinates on the rigid body-based coordinate system, in the second step, four measurement values, which comprise, a measurement value of a distance V0R0 between the point V0 and the point R0, a measurement value of a distance V1R0 between the point V1 and the point R0, a measurement value of a distance V2R1 between the point V2 and the point R1, and a measurement value of a distance V3R1 between the point V3 and the point R1, are received as the respective measurement values based on the input operation performed by the operator, the fourth step comprises:
a trilateration calculation step in which coordinates of the point R0 on a V0-based coordinate system having the point V0 as an origin and a straight line linking the point V0 to the point V1 as one axis, and coordinates of the point R1 on a V2-based coordinate system having the point V2 as an origin and a straight line linking the point V2 to the point V3 as one axis, are calculated from the four measurement values using a trilateration method; and a coordinate conversion step in which the coordinates of the point R0 on the V0-based coordinate system are converted into coordinates on the vehicle-based coordinate system by rotation and parallel movement and the coordinates of the point R1 on the V2-based coordinate system are converted into coordinates on the vehicle-based coordinate system by rotation and parallel movement, wherein in the fifth step, the relative attitude and the relative position of the origin are calculated as the calibration parameters from a correspondence relationship between positions of image coordinates of the point R0 and the point R1 included in the captured image and the coordinates of the point R0 and the point R1 on the vehicle-based coordinate system.

12. The calibration method according to claim 11, wherein, in the coordinate conversion step, coordinate conversion is executed by parallel movement alone when the point V2 and the point V3 are set to be identical to the point V0 and the point V1, respectively, and the point V0 and the point V1 are set such that the straight line linking the point V0 to the point V1 is parallel to one of the two axes of the vehicle-based coordinate system.

13. The calibration method according to claim 11, wherein when the vehicle-based coordinate system and the rigid body-based coordinate system are both three-dimensional coordinate systems having a third axis in a height direction from the ground, and at least one of six points, which comprise the point V0, the point V1, the point V2, the point V3, the point R0, and the point R1, is a known point not located on the ground, in the trilateration calculation step, points obtained by dropping the point V0, the point V1, the point V2, the point V3, the point R0, and the point R1 vertically onto the ground are calculated as a point $V0_G$, a point $V1_G$, a point $V2_G$, a point $V3_G$, a point $R0_G$, and a point $R1_G$, respectively, and coordinates of the point $R0_G$ on a $V0_G$-based coordinate system and coordinates of the point $R1_G$ on a $V2_G$-based coordinate system are calculated using a trilateration method, in the coordinate conversion step, coordinate conversion is executed using the coordinates of the point $R0_G$ on the $V0_G$-based coordinate system and the coordinates of the point $R1_G$ on the $V2_G$-based coordinate system, the coordinates having been calculated in the trilateration calculation step, and in the fifth step, the calibration parameters are calculated using values obtained as a result of the coordinate conversion executed in the coordinate conversion step.

14. The calibration method according to claim 11, wherein the fourth step further comprises;

an input error determination step in which a distance between the point R0 and the point R1 on the vehicle-based coordinate system is calculated from the respective coordinates thereof on the vehicle-based coordinate system, the coordinates having been determined in the coordinate conversion step, as a calculated value, a distance between the point R0 and the point R1 on the rigid body-based coordinate system is calculated from the respective coordinates thereof on the rigid body-based coordinate system as a design value, and a determination is made as to whether or not an absolute value of a difference between the calculated value and the design value is smaller than a preset threshold, wherein, when the absolute value is determined to be equal to or exceed the preset threshold, the measured distance input device is caused to display a message prompting the operator to reset the four measurement values.

15. The calibration method according to claim 11, wherein, in the second step, a display unit of the measured distance input device is caused to display the captured image captured by the camera, the captured image including a part of the vehicle and the marker.

16. The calibration method according to claim 15, wherein, in the second step, the display unit is caused to display an icon that is overlaid on the captured image so as to indicate a measurement location corresponding to an item, for which a numerical value has been set, among the four measurement values.

17. The calibration method according to claim 16, wherein when the icon is to be overlaid on the captured image in the second step, a position of the marker within the captured image is detected by implementing image processing on the captured image, and the icon is overlaid on the captured image after correcting a display position of the icon in accordance with a detection result.

18. The calibration method according to claim 10, wherein the plurality of vehicle-based points are constituted by three groups of points comprising a first group comprising three points constituted by a point V0, a point V1, and a point V2, a second group comprising three points constituted by a point V3, a point V4, and a point V5, and a third group comprising three points constituted by a point V6, a point V7, and a point V8, the three groups having known three-dimensional (3D) coordinates on the vehicle-based coordinate system and the three points of each group not existing on a straight line, the plurality of rigid body-based points are constituted by a fourth group of points comprising three points constituted by a point R0, a point R1, and a point R2, the fourth group having known 3D coordinates on the rigid body-based coordinate system and the three points of the fourth group not existing on a straight line, in the second step, nine measurement values, which comprise measurement values of respective distances between the point R0 and the three points constituting the first group, measurement values of respective distances between the point R1 and the three points constituting the second group, and measurement values of respective distances between the point R2 and the three points constituting the third group, are received as the respective measurement values based on the input operation performed by the operator, the fourth step comprises:

a trilateration calculation step in which coordinates of the point R0 on a 3D V0-based coordinate system having the point V0 as an origin, a straight line linking the point V0 to the point V1 as a first axis, and a second axis on a plane that includes the three points constituting the first group, coordinates of the point R1 on a 3D V3-based coordinate system having the point V3 as an origin, a straight line linking the point V3 to the point V4 as a first axis, and a second axis on a plane that includes the three points constituting the second group, and coordinates of the point R2 on a 3D V6-based coordinate system having the point V6 as an origin, a straight line linking the point V6 to the point V7 as a first axis, and a second axis on a plane that includes the three points constituting the third group, are calculated from the nine measurement values using a trilateration method; and a coordinate conversion step in which the coordinates of the point R0 on the 3D V0-based coordinate system are converted into coordinates on the vehicle-based coordinate system by rotation and parallel movement, the coordinates of the point R1 on the 3D V3-based coordinate system are converted into coordinates on the vehicle-based coordinate system by rotation and parallel movement, and the coordinates of the point R2 on the 3D V6-based coordinate system are converted into coordinates on the vehicle-based coordinate system by rotation and parallel movement, wherein, in the fifth step, the relative attitude and the relative position of the origin are calculated as the calibration parameters from a correspondence relationship between positions of image coordinates of the point R0, the point R1, and the point R2 included in the captured image and the coordinates of the point R0, the point R1, and the point R2 on the vehicle-based coordinate system.

* * * * *